(12) United States Patent
Thekadath et al.

(10) Patent No.: US 11,734,682 B2
(45) Date of Patent: *Aug. 22, 2023

(54) SYSTEMS AND METHODS FOR CREATING MULTIPLE RECORDS BASED ON AN ORDERED SMART CONTRACT

(71) Applicant: Visa International Service Association, San Francisco, CA (US)

(72) Inventors: Ajith Thekadath, San Ramon, CA (US); Timothy P. Tidwell, San Mateo, CA (US); Venkata Javaji, Union City, CA (US); Mondo Jacobs, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,641

(22) Filed: Sep. 1, 2022

(65) Prior Publication Data

US 2022/0414653 A1 Dec. 29, 2022

Related U.S. Application Data

(63) Continuation of application No. 16/928,832, filed on Jul. 14, 2020, now Pat. No. 11,468,441, which is a
(Continued)

(51) Int. Cl.
*G06Q 20/38* (2012.01)
*G06F 16/27* (2019.01)
(Continued)

(52) U.S. Cl.
CPC .......... *G06Q 20/389* (2013.01); *G06F 16/27* (2019.01); *G06F 21/602* (2013.01);
(Continued)

(58) Field of Classification Search
CPC ............. G06Q 20/389; G06Q 20/3825; G06Q 2220/00; G06F 16/27; G06F 21/602;
(Continued)

(56) References Cited

U.S. PATENT DOCUMENTS

| 10,521,623 B2 | 12/2019 | Rodriguez et al. |
| 2015/0379510 A1 | 12/2015 | Smith |

(Continued)

FOREIGN PATENT DOCUMENTS

| WO | 2017021155 A1 | 2/2017 | |
| WO | WO-2020041878 A1 * | 3/2020 | ......... G06F 16/1834 |

OTHER PUBLICATIONS

"Smart Contracts", BlockChain, Available Online at; https://blockchainhub.net/smart-contracts, Apr. 15, 2017, 5 pages.
(Continued)

*Primary Examiner* — Bryan F Wright
(74) *Attorney, Agent, or Firm* — Kilpatrick Townsend & Stockton LLP

(57) ABSTRACT

A method for creating a smart contract detailing an ordered set of events is disclosed. A smart contract can include information about multiple events and responses for each event. The events and response can be arranged in a predefined order. The responses can include adding new records to a blockchain.

20 Claims, 11 Drawing Sheets

Related U.S. Application Data continuation of application No. 16/618,776, filed as application No. PCT/US2018/037408 on Jun. 13, 2018, now Pat. No. 10,762,217.

(60) Provisional application No. 62/519,802, filed on Jun. 14, 2017.

(51) Int. Cl.
    *G06F 21/60* (2013.01)
    *H04L 9/06* (2006.01)
    *H04L 9/30* (2006.01)
    *H04L 9/32* (2006.01)
    *H04L 9/00* (2022.01)

(52) U.S. Cl.
    CPC .............. *H04L 9/0637* (2013.01); *H04L 9/30* (2013.01); *H04L 9/3247* (2013.01); *G06Q 20/3825* (2013.01); *G06Q 2220/00* (2013.01); *H04L 9/50* (2022.05)

(58) Field of Classification Search
    CPC ....... H04L 9/0637; H04L 9/30; H04L 9/3247; H04L 9/50
    USPC ......................................................... 713/193
    See application file for complete search history.

(56) References Cited

U.S. PATENT DOCUMENTS

| | | |
|---|---|---|
| 2017/0011460 A1 | 1/2017 | Molinari et al. |
| 2017/0103468 A1 | 4/2017 | Orsini et al. |
| 2017/0132621 A1 | 5/2017 | Miller et al. |
| 2017/0140408 A1 | 5/2017 | Wuehler |
| 2017/0155515 A1 | 6/2017 | Androulaki et al. |
| 2017/0178127 A1 | 6/2017 | Kravitz |
| 2017/0232300 A1 | 8/2017 | Tran et al. |
| 2017/0237554 A1 | 8/2017 | Jacobs et al. |
| 2017/0300627 A1 | 10/2017 | Giordano et al. |
| 2017/0323294 A1 | 11/2017 | Rohlfing et al. |
| 2018/0032383 A1 | 2/2018 | Surcouf et al. |
| 2018/0123779 A1 | 5/2018 | Zhang |
| 2018/0144156 A1 | 5/2018 | Marin |
| 2018/0165612 A1 | 6/2018 | Saxena et al. |
| 2019/0036692 A1 | 1/2019 | Sundaresan et al. |
| 2019/0229926 A1 | 7/2019 | Handa et al. |
| 2019/0253258 A1 | 8/2019 | Thekadath et al. |
| 2019/0289019 A1 | 9/2019 | Thekadath et al. |
| 2020/0218830 A1 | 7/2020 | Topart et al. |

OTHER PUBLICATIONS

U.S. Appl. No. 16/618,776 , "First Action Interview Pilot Program Pre-Interview Communication", dated Mar. 18, 2020, 5 pages.
U.S. Appl. No. 16/618,776 , "Notice of Allowance", dated Apr. 21, 2020, 15 pages.
U.S. Appl. No. 16/928,832 , "Non-Final Office Action", dated Feb. 24, 2022, 47 pages.
U.S. Appl. No. 16/928,832 , "Notice of Allowance", dated Jun. 23, 2022, 11 pages.
Egbertsen et al., "Replacing Paper Contracts With Ethereum Smart Contracts Contract Innovation with Ethereum", Available Online at: https://allquantor.at/blockchainbib/pdf/egbertsen2016replacing.pdf, Jun. 10, 2016, 35 pages.
EP18816544.3 , "Extended European Search Report", dated Apr. 20, 2020, 9 pages.
EP18816544.3 , "Office Action", dated Dec. 14, 2021, 11 pages.
PCT/US2018/037408 , "International Preliminary Report on Patentability", dated Dec. 26, 2019, 6 pages.
PCT/US2018/037408 , "International Search Report and Written Opinion", dated Sep. 20, 2018, 10 pages.
RU2020100461 , "Notice of Decision to Grant", dated Apr. 18, 2022, 24 pages.
RU2020100461 , "Office Action", dated Jan. 24, 2022, 14 pages.
Silverberg et al., "Getting Smart: Contracts on the BlockChain", Available Online at: https://wcb.archivc.org/wcb/20160513115207/ https://www.iif.com/publication/rcscarch-notelgetting-smart-contracts-blockchain, May 2016, pp. 1-11.
Vedrunes , "A Peer-to-Peer Transportation System of Objects", Available Online at: https://pacifics.org/whitepaper, Mar. 31, 2017, 5 pages.

* cited by examiner

SMART CONTRACT IDENTIFIER     400

| ORDER | TRIGGER EVENTS | RESPONSES |
|---|---|---|
| FIRST | THIRD USER COMPLETES FIRST ACTIVITY | GENERATE FIRST DATA PACKAGE |
| SECOND | FOURTH USER COMPLETES SECOND ACTIVITY | GENERATE SECOND DATA PACKAGE |
| THIRD | FIFTH USER COMPLETES THIRD ACTIVITY | GENERATE THIRD DATA PACKAGE |
| FOURTH | SIXTH USER COMPLETES FOURTH ACTIVITY | GENERATE FOURTH DATA PACKAGE |
| FIFTH | SEVENTH USER COMPLETES FIFTH ACTIVITY | GENERATE FIFTH DATA PACKAGE |
| SIXTH | EIGHTH USER COMPLETES SIXTH ACTIVITY | GENERATE SIXTH DATA PACKAGE |
| SEVENTH | NINTH USER COMPLETES SEVENTH ACTIVITY | GENERATE SEVENTH DATA PACKAGE AND EIGHTH DATA PACKAGE |

FIG. 4

SYSTEMS AND METHODS FOR CREATING MULTIPLE RECORDS BASED ON AN ORDERED SMART CONTRACT

CROSS REFERENCE TO RELATED APPLICATIONS

This application is a continuation of U.S. application Ser. No. 16/928,832, filed Jul. 14, 2020 which is a continuation of U.S. application Ser. No. 16/618,776, filed on Dec. 2, 2019, which is a 35 U.S.C. 371 patent application which is an international application of PCT Application No. PCT/US2018/037408, with an international filing date of Jun. 13, 2018, which claims the benefit of the filing date of U.S. Provisional Application No. 62/519,802, filed on Jun. 14, 2017, which are herein incorporated by reference in its entirety for all purposes.

BACKGROUND

Blockchain record systems are designed to securely record information. When a computer submits new information to a blockchain, the information becomes immutably stored.

Typically, blockchain record systems allow anyone to add new data to a blockchain. This open access can be useful, as it allows multiple users to contribute to the record, instead of just one. However, open access in blockchain record systems can create vulnerabilities to receiving incorrect data and/or having disorganized records.

To illustrate, consider a physical shipping process that involves three different transportation segments. The first segment may be transportation from point A to point B, the second segment may be transportation from point B to point C, and the third segment may be transportation from point C to point D. When a transportation segment is completed, a new blockchain record can be created in order to monitor shipping progress. However, with a typical blockchain record system, it is possible to record that the second transportation segment is complete before recording that the first transportation segment is complete. This renders the record intelligible and inaccurate, as the second segment physically cannot be completed before the first segment.

Regardless of whether such a record entry was made fraudulently or accidentally, it causes the blockchain record to become disorganized and potentially incorrect. This sort of mistake cannot be corrected, because once information is added to a blockchain it cannot be changed.

At best, the first transportation segment may have been completed, but not yet reported. That segment could be reported at a later time. However, the blockchain will now still show that the second segment was completed at an earlier time than the first segment.

Embodiments of the invention address these and other problems individually and collectively.

SUMMARY

Embodiments of the invention provide systems and methods for creating a smart contract which specifies a specific order for a set of events, as well new records to create in response to the events. The smart contract thereby provides a filter for new records being submitted to a blockchain record. If an event seems to occur out of order, or a new record entry otherwise is submitted out of order, the record can be rejected and not added to the blockchain. As a result, blockchain records are created and maintained in an organized and sequential manner.

One embodiment of the invention is directed to a method. The method comprises receiving a smart contract indicating that an ordered set of interactions will take place in response to an ordered set of events, and in response to a first event of the ordered set of events, transmitting an instruction to generate a first data package for a first interaction of the ordered set of interactions to a second node computer. The smart contract indicates that the first interaction will take place in response to the first event. The method also includes receiving the first data package for the first interaction from the second node computer, and generating a first block for a blockchain. The first block includes the first data package for the first interaction. The method further comprises, transmitting an instruction to generate a second data package for a second interaction of the ordered set of interactions to the second node computer in response to a second event of the ordered set of events. The smart contract indicates that the second interaction will take place in response to the second event. The method also includes receiving the second data package for the second interaction from the second node computer, and generating a second block for the blockchain. The second block includes the second data package for the first interaction.

Another embodiment of the invention is directed to an administrative node computer configured to perform the above-described method.

Another embodiment of the invention is directed to a method comprising generating a smart contract indicating that an ordered set of interactions will take place in response to an ordered set of events, and generating a first data package for a first interaction of the ordered set of interactions in response to a first event of the ordered set of events. The smart contract indicates that the first interaction will take place in response to the first event. The method also includes transmitting the first data package to an administrative node computer. The administrative node computer generates a first block for a blockchain, and the first block includes the first data package. The method further comprises generating a second data package for a second interaction of the ordered set of interactions in response to a second event of the ordered set of events. The smart contract indicates that the second interaction will take place in response to the second event. The method also includes transmitting the second data package to the administrative node computer. The administrative node computer creates a second block for the blockchain, and the second block includes the second data package.

Another embodiment of the invention is directed to a second node computer configured to perform the above-described method.

Further details regarding embodiments of the invention can be found in the Detailed Description and the Figures.

BRIEF DESCRIPTION OF THE DRAWINGS

FIG. 4 shows an example of a smart contract, according to an embodiment of the invention.

DETAILED DESCRIPTION

Figure 1:
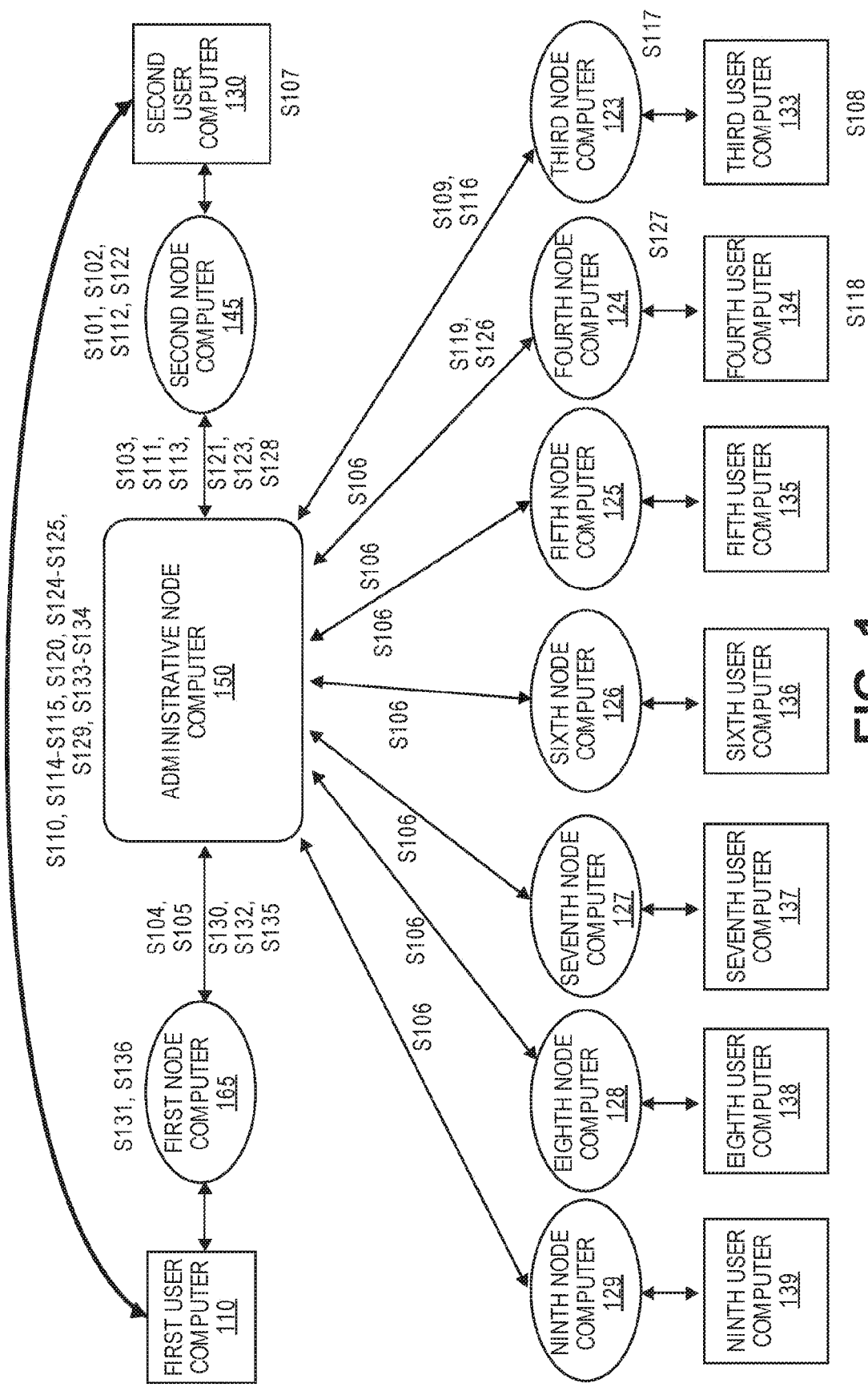
FIG. 1 shows a block diagram of a system according to an embodiment of the invention.

Embodiments of the present invention provide systems and methods for creating an ordered smart contract. The smart contract can include details about a series of expected future events, and can specify an order in which they are expected to occur. The smart contract can further include details about a series of records to create in response to the events. Each event may have one or more corresponding records.

The smart contract can be enforced by an administrative node computer. The administrative node computer may also generate the blockchain record, and thus can act as a gate-keeper ensuring that records are only created as specified by the smart contract. As a result, blockchain records are created in an organized and intelligible manner.

In some embodiments, various node computers may send notifications to the administrative node computer when different events are completed. Each node computer may have previously enrolled with the record-keeping network via communications with the administrative node computer, and the administrative node computer may have provided each node computer with a unique private key for future communications. As a result, each event notification may be digitally signed using a private key, such that the administrative node computer can verify the authenticity of the notification. The notification can serve as a trigger for a subsequent record creation (e.g., based on the smart contract).

In some embodiments, the events can be services, and the new records can be representative of payment transactions being provided for the services. For example, a data package can be created with information defining a payment transaction, and the data package can be recorded in the blockchain. Thus, the smart contract can ensure that payments are only made if a corresponding service or task is completed within a predefined order.

Embodiments apply to other types of events and records as well. For example, the events can include tasks involved with a medical procedure such as a surgery, and the new records can represent updates to a surgery log or patient medical data. As another example, the events can include specific tasks within a construction project (e.g., build a foundation, install plumbing, install electrical wiring, etc.), and the new records can represent project status updates. Thus, embodiments can apply to any suitable process where events or activities should happen in a specific order, and/or where the events or activities are performed by different entities.

Additional features that can be included in embodiments of the invention are described in the International Application US2017/046364, in the International Application US2017/059744, and in the International Application US2018/027455, each of which are incorporated by reference herein in their entirety for all purposes.

Prior to discussing specific embodiments of the invention, some terms may be described in detail.

An "event" may include an occurrence, an incident, or a happening. More specifically, an event can be an action, activity, or task performed by an actor. Examples of events includes a package being shipped, or a package being inspected, an insurance policy being created, a building foundation being dug, a medical inspection being performed, and any other suitable type of job completion.

An "interaction" may include an exchange or a communication. Example interactions include a value transfer (e.g., a payment transaction or a transfer of access privileges) and providing updated information (e.g., medical records, academic records, etc.).

A "smart contract" may be computer-executable instructions configured to cause a processor to enforce a policy, agreement, or commitment. A smart contract may be used to represent an agreement between two or more parties, where the terms of the smart contract are recorded in a computer language as a set of instructions. Smart contracts may include a number of policies that must be enforced in order to complete a transaction between the two or more parties. A smart contract may be distributed across one or more nodes of a blockchain network, which may automatically execute the smart contracts.

In some embodiments, a single smart contract can include computer-executable instructions configured to cause a processor to enforce multiple (e.g., two or more) policies, agreements, or commitments. Such a smart contract may be used to represent an agreement between two or more sets of two or more parties. Within a smart contract with multiple policies, each policy can include the completion of an event. When the event is completed, a corresponding interaction can be triggered. Thus, a smart contract can specify a set (e.g., two or more) of events, as well as a set of interactions that are to take place when the specific events are completed. This type of smart contract can include information specifying that the events (and/or corresponding interactions) are to be completed in a specific order. If the events are not completed according to the pre-defined order, one or more interactions may not be triggered.

A "data package" may refer to a collection of digital information. For example, a data package can be information that exists in binary format. In some embodiments, a data package can include information about anything that can be described in a record. For example, a data package can include any suitable type of digital information, such as ownership data, product status data, project update data, payment transaction data, etc.

The term "node" may refer to a connection point. In some embodiments, a node may be a physical electronic device that is capable of creating, receiving, or transmitting data. In other embodiments, a node may be a software module on a computing device, the software module a connection point in a communication network. In some embodiments, a node may be a computing device within a record-keeping network. A node may be able to create a data package, transfer a data package, receive a data package, validate a data package, access a central record, and/or perform any other suitable functions. Different types of nodes may be able to perform different sets of functions within a recording network. In some embodiments, a node may be associated with and/or operated by a financial institution computer (e.g., a bank), a payment processor computer, a third party computer, or any other suitable entity.

A "record" may refer to evidence of one or more interactions. A digital record can be electronic documentation of an interaction. A record can include a record identifier and record information. For example, record information can include information describing one or more interactions and/or information associated with the interactions (e.g., a digital signature). Record information can include multiple distinct data packages, each data package having different data describing a different interaction. A record identifier can be a number, title, or other data value used for identifying a record. A record identifier can be nondescript, in that it may not provide any meaningful information about the record information in the record. Examples of records include medical records, academic records, transaction records within a ledger of transactions, etc. Another example of a record is a block in a blockchain. An individual block can be an individual record, and a blockchain can be a series of records. A blockchain header is an example of a record identifier, and a blockchain body is an example of record information.

The term "ledger of transactions" may refer to a compilation of data from previous transactions. The ledger of transactions may be a database or other comparable file structure that may be configured to store data from all previous transactions, including the date and time of the transaction, the transaction amount, and identification information for the participants of the transaction (e.g., the sender and the receiver of the transaction amount). In some embodiments, the ledger of transactions may be in the form of an electronic ledger (e.g., blockchain) in which data already stored in the electronic ledger is unalterable.

A "blockchain" can be a database that maintains a continuously-growing list of records secured from tampering and revision. A blockchain may include a number of blocks of interaction records recorded on one or more nodes. Each block in the blockchain can also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair algorithm. However, a key pair may also be generated using other means, as one of ordinary skill in the art would understand.

The term "digital signature" may refer to an electronic signature for a message. A digital signature may be a numeric data value, an alphanumeric data value, or any other type of data including a graphical representation. A digital signature may be a unique data value generated from a message and a private key using an encrypting algorithm. In some embodiments, a validation algorithm using a public key may be used to verify the signature.

An "enterprise identifier" may include an identifier for a user. For example, an enterprise identifier can be a globally unique identifier for an end user that submits new record information to a node in a record-keeping network, or for an end user that receives information about new record information (e.g., a value transfer) from a node. In some embodiments, an enterprise identifier can also indicate a specific node with which a user is associated. An enterprise identifier may include alphanumeric characters, special characters, and any other suitable symbol.

An "address identifier" may include an identifier for a participant. For example, an address identifier can represent a node or a service provider in a network. In some embodiments, a communication can be directed to a specific node by including the node's address identifier. An address identifier can include a string of characters, such as letters, numbers, etc. For example, an address identifier can be a string of 5, 10, 15, or any other suitable number of characters. In some embodiments, a public key associated with a participant can be used as the participant's address identifier.

A "class identifier" may include a data value that represents a specific type of record. Class identifiers can be used to identify any suitable class of recordable information. For example, a class identifier can be configured to identify medical information-type records, academic credential-type records, product identifier-type records, employee data-type records, activity-type records (e.g., construction activities, plumbing activities, etc.), value transfer records of various types (e.g., US dollar payments, British pound payments, Chinese yuan payments, digital rights data transfers, property deed transfers, event ticket transfers, game credit transfers, energy credit transfers, mobile phone minute transfers, etc.), or any other suitable type of record. Classes can be divided in any suitable manner. In some embodiments, a class identifier can also indicate that a specific participant is authorized to create and/or receive data packages for that type of record. A class identifier can include a string of characters, such as letters, numbers, etc. For example, an address identifier can be a string of 5, 10, 15, or any other suitable number of characters.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a recording network that is administered by an administrative node computer 150. The first node computer 165, the second node computer 145, the third node computer 123, the fourth node computer 124, the fifth node computer 125, the sixth node computer 126, the seventh node computer 127, the eighth node computer 128, the ninth node computer 129, and any other suitable number of node computers participate in the network. The first user computer 110 operated by a first user (not shown) can submit record update instructions via the first node computer 165, the second user computer 130 operated by a second user (not shown) can submit record update instructions via the second node computer 145, and other user computers (e.g., the third user computer 133, the fourth user 134, the fifth user computer 135, the sixth user computer 136, the seventh user computer 137, the eighth user computer 138, the ninth user computer 139) can also submit record update instructions via their associated node computers. Additionally, the various node computers can inform associated user computers about record updates that have been submitted.

All of the computers shown in the system 100 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The system 100 can be configured to create and maintain records of any suitable types. The administrative node computer 150 can administrate the record-keeping process by providing a number services. For example, the administrative node computer 150 can build new blocks for a blockchain, the new blocks including updated record information. The administrative node computer 150 can also enroll nodes and end users, as well as regulate the behavior of participating nodes in order to keep the records secure and reliable. The administrative node computer 150 can further verify new data packages and inform participating nodes about new interactions and blocks.

Additionally, the administrative node computer 150 can facilitate the creation of sequentially-ordered records as defined by one or more smart contracts. For example, the administrative node computer 150 can receive and enforce smart contracts. This can include monitoring for when a smart contract policy has been satisfied, and by triggering the creation of a new record based on the satisfied policy.

While the administrative node computer 150 can build and maintain an ordered set of records, the various node computers can submit new information to the administrative node computer 150 for recording. For example, the first node computer 165 and the second node computer 145 can create and submit data packages describing interactions of various classes. These data packages may be created and submitted based on interaction instructions received from the first user computer 110 and/or the second user computer 130, or based on triggering events as defined in a smart contract.

Additionally, one or more node computers may be able to generate and/or submit smart contracts. For example, the second node computer 145 can create a smart contract defining one or more events that may take place in the future, as well as an expected order for the events. Additionally, the smart contract can define one or more records to create in response to the events. The second node computer 145 can transmit the smart contract to the administrative node computer 150, which can manage and enforce the smart contract. For example, the administrative node computer 150 can instruct the second node computer 145 to create and submit a data package representing a specific interaction after a certain triggering event takes place. As a result, records (e.g., of interactions) can be built in a pre-defined order.

While FIG. 1 specifically illustrates the nine distinct node computers, the system 100 can include any suitable number of node computers. Additionally, each node computer can communicate with more than just one user computer. For example, the first node computer 165 can communicate with other user computers beyond the first user computer 110.

Further, the system 100 can include more than one administrative node computer 150 for administering the recording network.

The system 100 may be used to process, approve, and record any suitable type of information. For example, the system 100 can be used to record information about new interactions, such as new projects and activities, new value transfers, new medical patient data, new academic achievements, etc.

Figure 2:
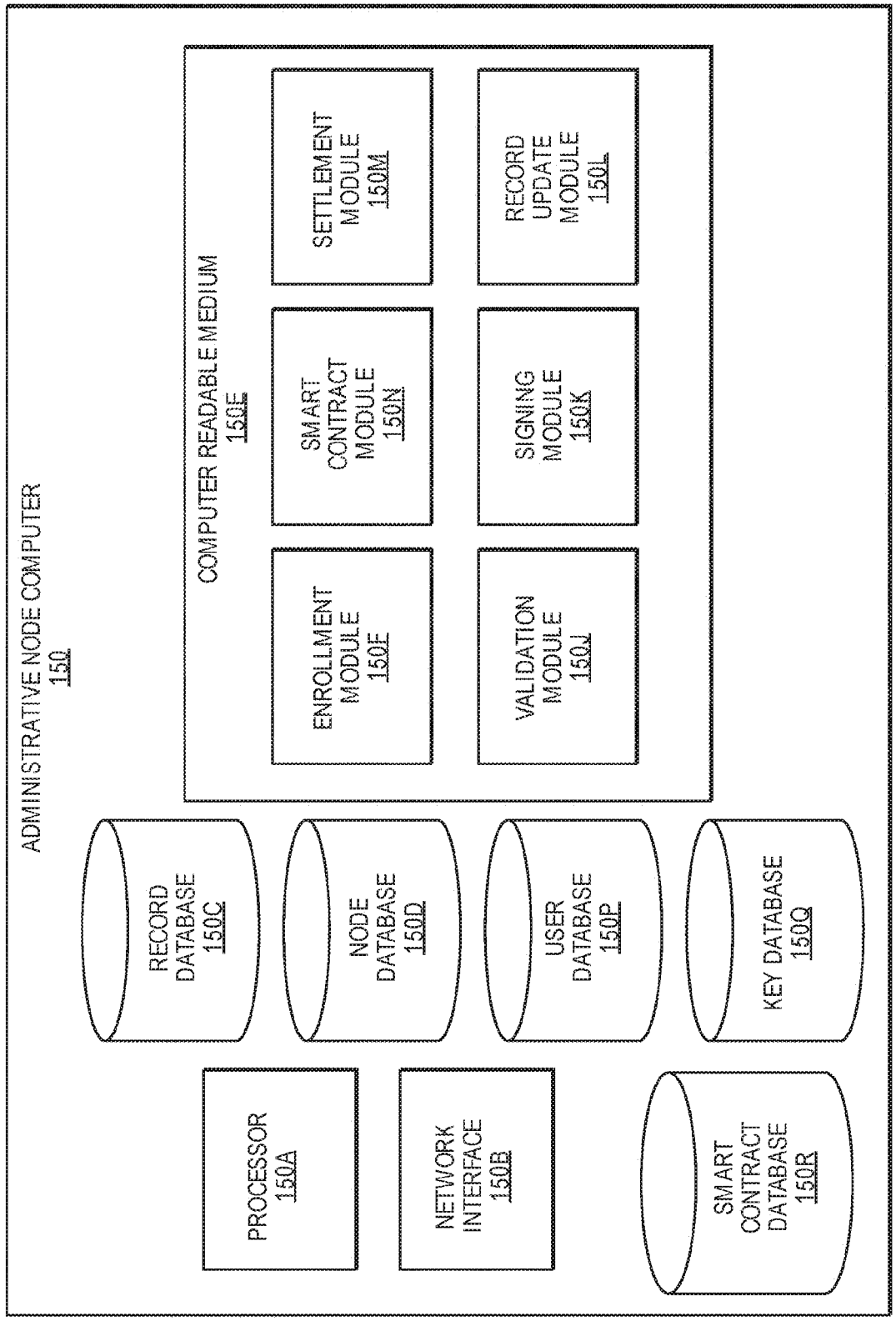
FIG. 2 shows a block diagram of an administrative node computer, according to an embodiment of the invention.

An example of an administrative node computer 150, according to some embodiments of the invention, is shown in FIG. 2. The administrative node computer 150 comprises a processor 150A, a network interface 150B, a record database 150C, a node database 150D, a user database 150P, a key database 150Q, a smart contract database 150R, and a computer readable medium 150E.

The record database 150C can store records. For example, interaction data received from nodes in the network can be inserted into a record and stored in the record database 150C. In some embodiments, the records can take the form of a blockchain with block records, each block including one or more data packages representing one or more interactions.

The node database 150D can include information about nodes, such as the first node computer 165, the second node computer 145, and the other node computers shown in FIG. 1. For example, the node database can include identifiers associated with the first node computer 165, such as an address identifier and one or more class identifiers. The node database 150D can also include information about restrictions, such as spending limits associated with different nodes.

The user database 150P can include information about enrolled end users, such as the first user, the second user, as well as devices associated with the users (e.g., the first user computer 110, the second user computer 130, and other user computers shown in FIG. 1). This can include enterprise identifiers, as well as information about with which node the user is associated. For example, the second user computer's enterprise identifier can be associated with the second node computer's address identifier as well as a specific class identifier.

The key database 150Q can store encryption keys. For example, the key database 150Q can include a public key for each node, as well as a private key associated with the administrative node computer 150. In some embodiments the key database 150Q can take the form of a hardware security module (HSM).

The smart contract database 150R can store one or more smart contracts. For example, the smart contract database 150R can store a copy of a smart contract submitted by a node computer that defines one or more events and one or more corresponding interactions. The smart contract database 150R can further store information describing the completion of a given smart contract, such as which events and/or interactions have already been completed, and an indication of the next expected event. Further, one or more digital signatures associated with a given smart contract can be stored.

The computer readable medium 150E may comprise an enrolling module 150F, validation module 150J, a signing module 150K, a record update module 150L, a settlement module 150M, a smart contract module 150N, and any other suitable software module. The computer readable medium 150E may also comprise code, executable by the processor 150A for implementing a method comprising receiving a smart contract indicating that an ordered set of interactions will take place in response to an ordered set of events; in response to a first event of the ordered set of events, transmitting, to a second node computer, an instruction to generate a first data package for a first interaction of the ordered set of interactions, wherein the smart contract indicates that the first interaction will take place in response to the first event; receiving, from the second node computer, the first data package for the first interaction; generating a first block for a blockchain, the first block including the first data package for the first interaction; in response to a second event of the ordered set of events, transmitting, to the second node computer, an instruction to generate a second data package for a second interaction of the ordered set of interactions, wherein the smart contract indicates that the second interaction will take place in response to the second event; receiving, from the second node computer, the second data package for the second interaction; and generating a second block for the blockchain, the second block including the second data package for the first interaction.

The enrolling module 150F may comprise code that causes the processor 150A to enroll node computers for joining the recording network. For example, the enrolling module 150F may contain logic that causes the processor 150A to evaluate whether or not an entity can enroll, as well as what level of risk to assign to a new entity. A risk level can be affected by whether the entity is a well-known and reliable organization, whether it has established a settlement account or other settlement processes, whether it is located in a risky country, etc. In addition to assigning a risk level, the administrative node computer 150 can issue activity limits for the node based on the risk profile. Activity limits can include, for example, maximum transaction threshold limits and/or velocity limits, such as a limit on the number of payment transactions or total transaction value that can be submitted within a certain time period (e.g., a day, a week, or a month).

The enrolling module 150F may also include instructions for generating and assigning a unique address identifier for a newly enrolled node. Additionally, there may be instructions for generating and distributing keys to a newly enrolled node. For example, the administrative node computer 150 may generate a key pair for a node. The administrative node computer 150 can store the public key and provide the private key to the node computer.

The enrolling module 150F can further include instructions for enrolling end users. For example, the administrative node computer 150 can receive information about a new user (e.g., a name, address, account number, phone number, a business' corporate profile, etc.) from a node, store the user information, and then assign a unique enterprise identifier to the user. In some embodiments, the enterprise identifier can include a subset of characters that are indicative of the associated node or the node's address identifier.

The validation module 150J may comprise code that causes the processor 150A to validate a new data package so that the data package can be entered in the records. For example, the validation module 150J may contain logic that causes the processor 150A to check that a data package includes an address identifier and a class identifier are both valid and associated with the same node computer, and to check that limits associated with the submitted class identifier have not been exceeded and are not currently being exceeded by the new data package.

The validation module 150J may further contain logic that causes the processor 150A to verify that all entities associated with the data package (e.g., one or more nodes, and one or more users) are registered with the network and have been screened for compliance. The administrative node computer 150 can also evaluate transaction risk, for example by assessing the transaction velocity of one or more parties involved, or by determining whether the submitting node has any warnings issued.

The validation module 150J may further comprise code that causes the processor 150A to verify the authenticity of one or more digital signatures. For example, the validation module 150J may contain logic that causes the processor 150A to use a node computer's public key to verify the authenticity of a digital signature associated with that node computer.

The signing module 150K may comprise code that causes the processor 150A to generate digital signatures. For example, the signing module 150K may contain logic that causes the processor 150A to generate a digital signature for a data package and/or a smart contract using an administrative node private key. The administrative node computer's digital signature can serve to indicate the authenticity of a data package, and can provide a guarantee that a transfer is valid and trustworthy.

The record update module 150L may comprise code that causes the processor 150A to maintain and update a set of records. For example, the record update module 150L may contain logic that causes the processor 150A to record information about a new interaction (e.g., as indicated in a new data package). In some embodiments, the record update module 150L may include instructions for including a new data package in the next blockchain block.

The record update module 150L may further include instructions for, when a new data package is created, informing the parties associated with the interactions described in the data package. For example, when a new payment transaction is validated and signed, the administrative node computer 150 may send information about the new payment transaction to a receiving node (e.g., the second node computer 145) and/or the user computers.

In some embodiments, the participating node computers may not maintain a separate set of records, and may instead refer to the centrally-maintained records of the administrative node computer 150. For example, the first node computer 165 and the second node computer 145 may each be light nodes. In such a case, the administrative node computer 150 may provide these nodes with real-time access to the central records, or the administrative node computer 150 may provide regular record updates (e.g., updates can be sent every 10 seconds, 1 minute, 5 minutes, etc.). As a result, other nodes may be aware of new interactions immediately or soon after the interactions are recorded.

In some embodiments, participating node computers may not be able to see all of the record information, and they may instead have a filtered or permissioned view of the records. For example, the first node computer 165, the second node computer 145, the first user computer 110, and/or the second user computer 130 may only be able to view interaction records with which they are associated (e.g., transactions to which they are a party) when accessing the records at the administrative node computer 150. For example, the second node computer 145 may be able to view all block headers, but may only be able to view block bodies and interaction records with which it is associated.

In some embodiments, there may be multiple administrative node computers 150 that each receive and process different data packages with information about different interactions, and then update their own records. These different administrative node computers may communicate with one another to share new records and to confirm that their records include the same interactions.

The settlement module 150M may comprise code that causes the processor 150A to settle a promised value between accounts. For example, the settlement module 150M may contain logic that causes the processor 150A to debit the first node's settlement account at a central bank by an amount indicated in an interaction record, and to credit the second node's settlement account with that same amount (or that amount less assessed fees).

In some embodiments, settlement can take place in multiple steps (e.g., as a result of transferring a value using multiple atomic transactions). For example, a first settlement can include debiting the first node's settlement account by a first amount, and crediting an administrative node settlement account with that same first amount. Then, a second settlement can include debiting a (same or different) administrative node settlement account by a second amount, and then crediting the second node's settlement account with that same second amount. As a result, a value is transferred from the first node to the second node via the administrative node.

The smart contract module 150N may comprise code that causes the processor 150A to receive, validate, store, and/or execute a smart contract. In some embodiments, the smart contract can be either added to the blockchain record or stored in a smart contract database. The smart contract module 150N may contain logic that causes the processor 150A to obtain a digital signature for each responsible party indicated by the smart contract (e.g., each party promising a payment), and to verify each digital signature using corresponding public keys. In some embodiments, the administrative node computer 150 may place a hold on funds in settlement accounts (e.g., a node's settlement account at a central bank) based on payments in the smart contract. Further, the smart contract module 150N may contain logic that causes the processor 150A to transmit messages to each party associated with the smart contract when the smart contract is put into effect.

The smart contract module 150N can additionally comprise code that causes the processor 150A to determine whether an event indicated in a smart contract has taken place. This can include receiving a notification message that the event took place (e.g., from the actor that caused the event), and verifying an attached digital signature. Further, the smart contract module 150N may contain logic that causes the processor 150A to initiate a response based on the event, according to the smart contract. This can include sending an instruction to a node computer to generate a data package for updating a record database.

Referring back to FIG. 1, the second node computer 145 can, as mentioned above, participate in the recording network by creating and submitting new data packages with new interaction data in order to update the records on behalf of one or more users. Additionally, the second node computer 145 can create and submit a smart contract to the recording network, such that other nodes can trust that future data packages will be created.

Figure 3:
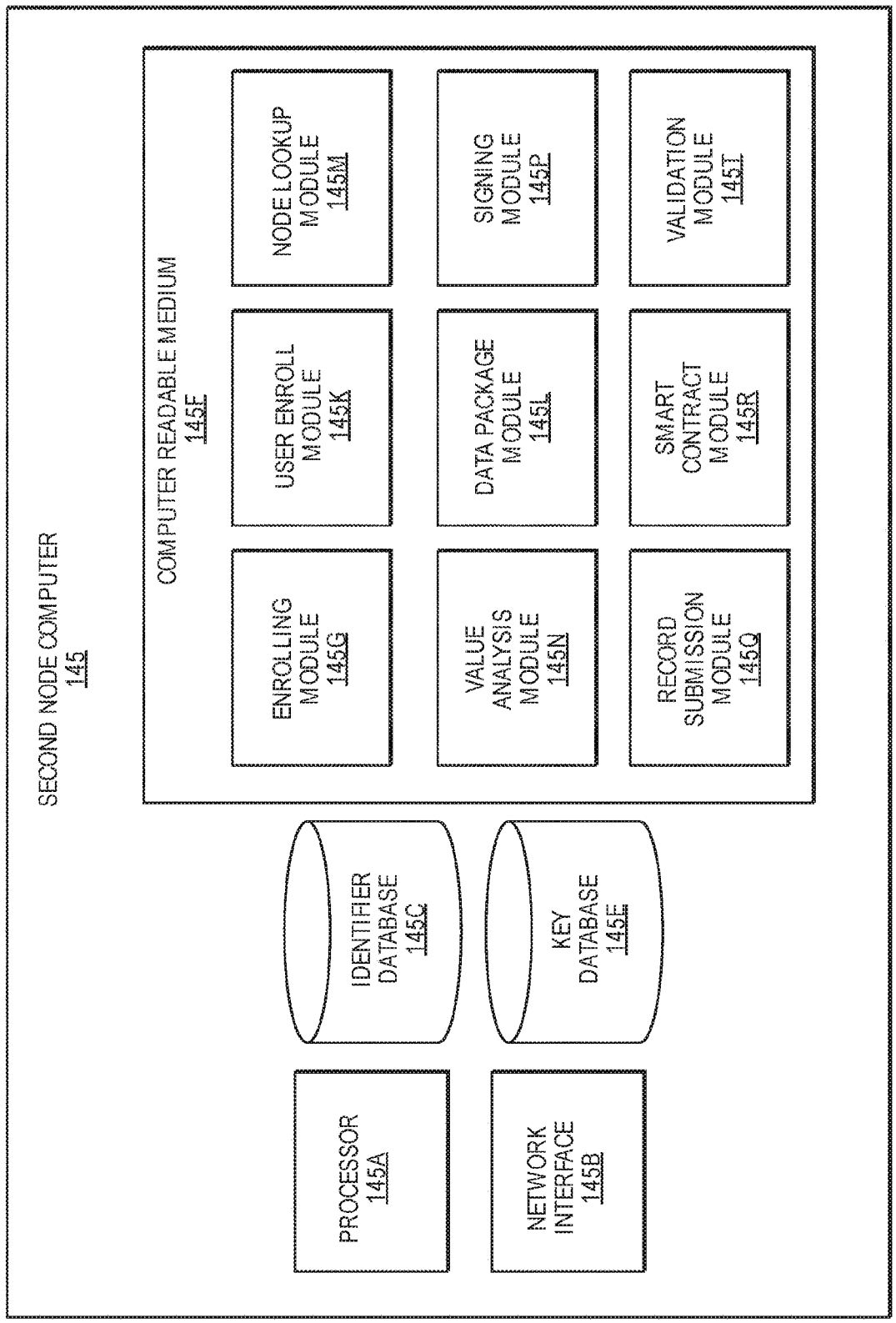
FIG. 3 shows a block diagram of a second node computer, according to an embodiment of the invention.
Figure 5A:
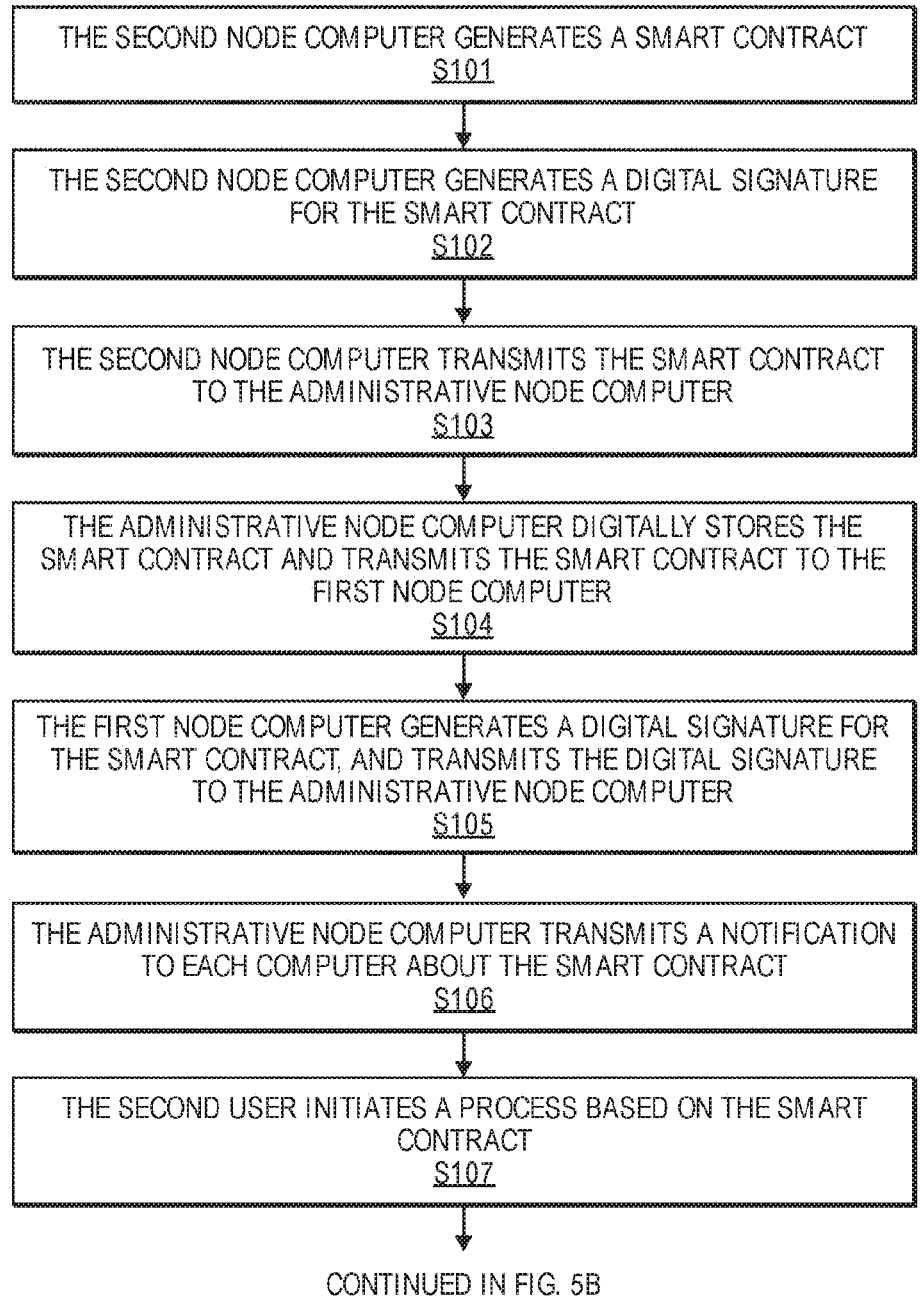
FIGS. 5A-5G shows a flow diagram illustrating a method for creating records based on an ordered smart contract, according to embodiments of the invention.
Figure 5B:
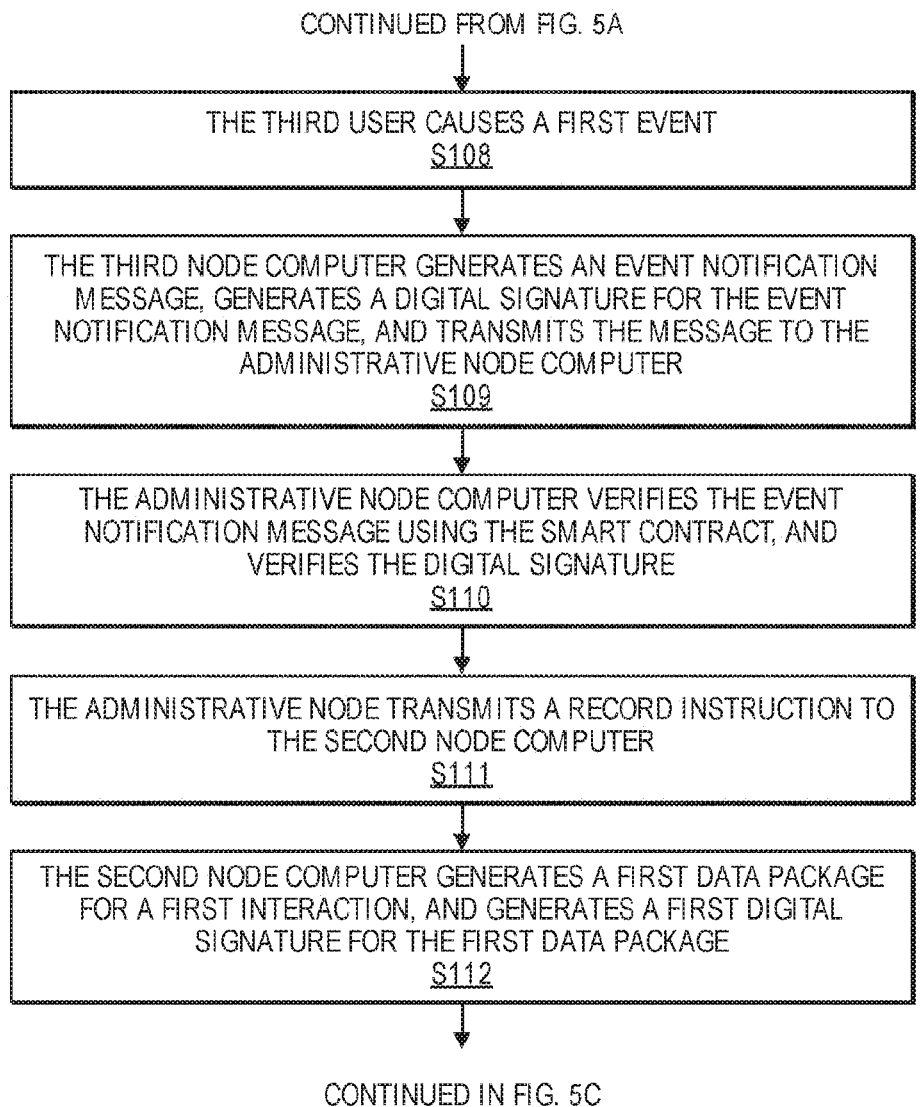
Figure 5C:
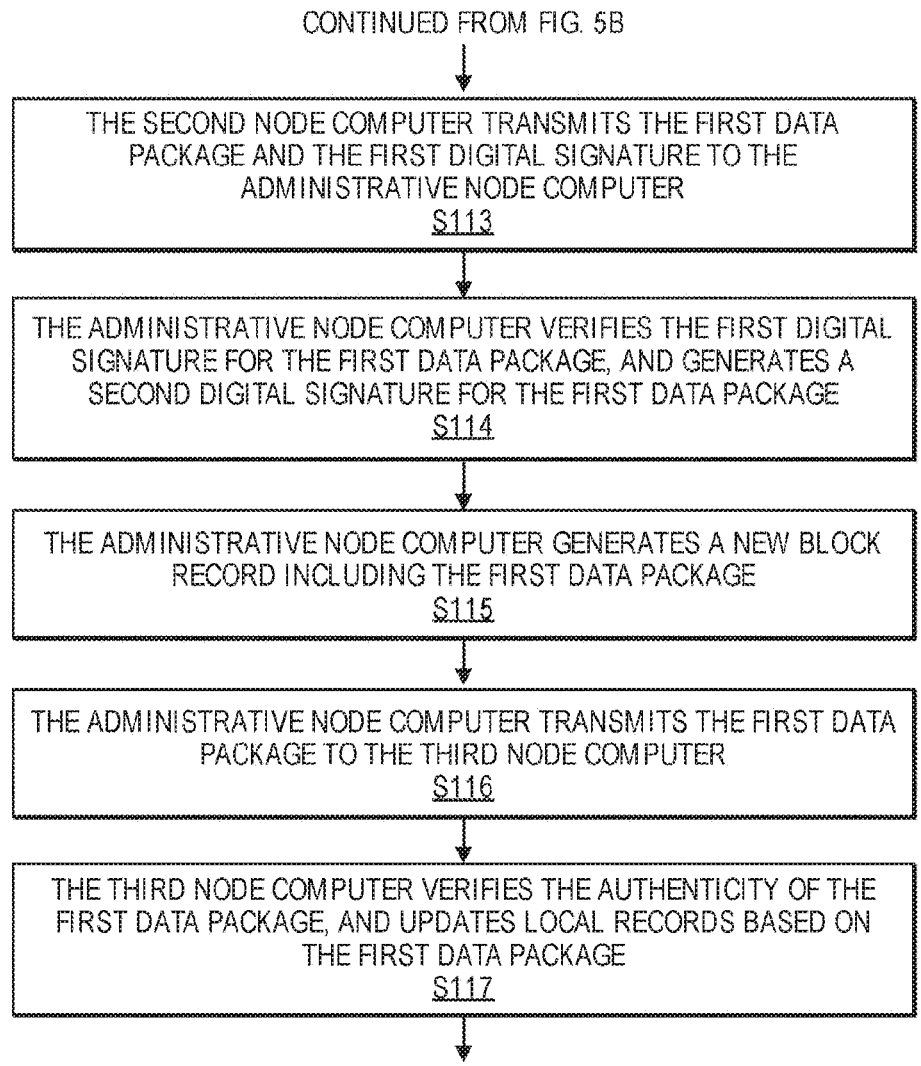
Figure 5D:
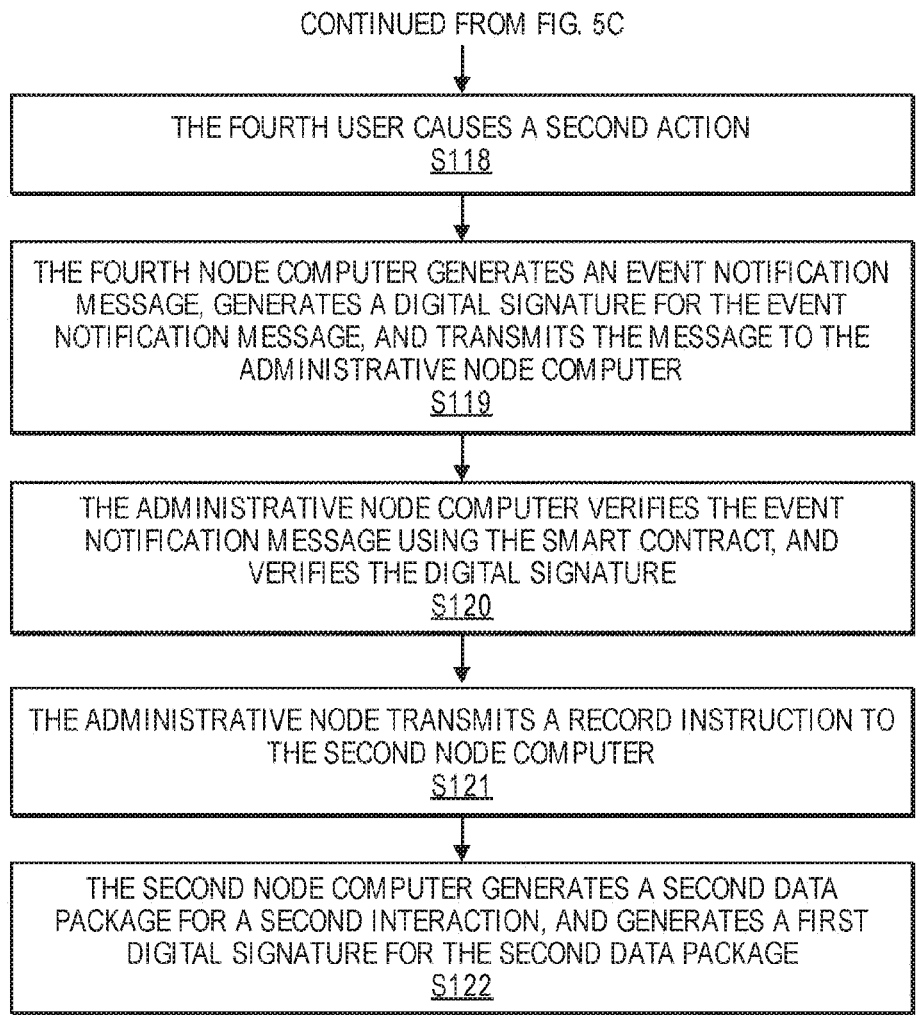
Figure 5E:
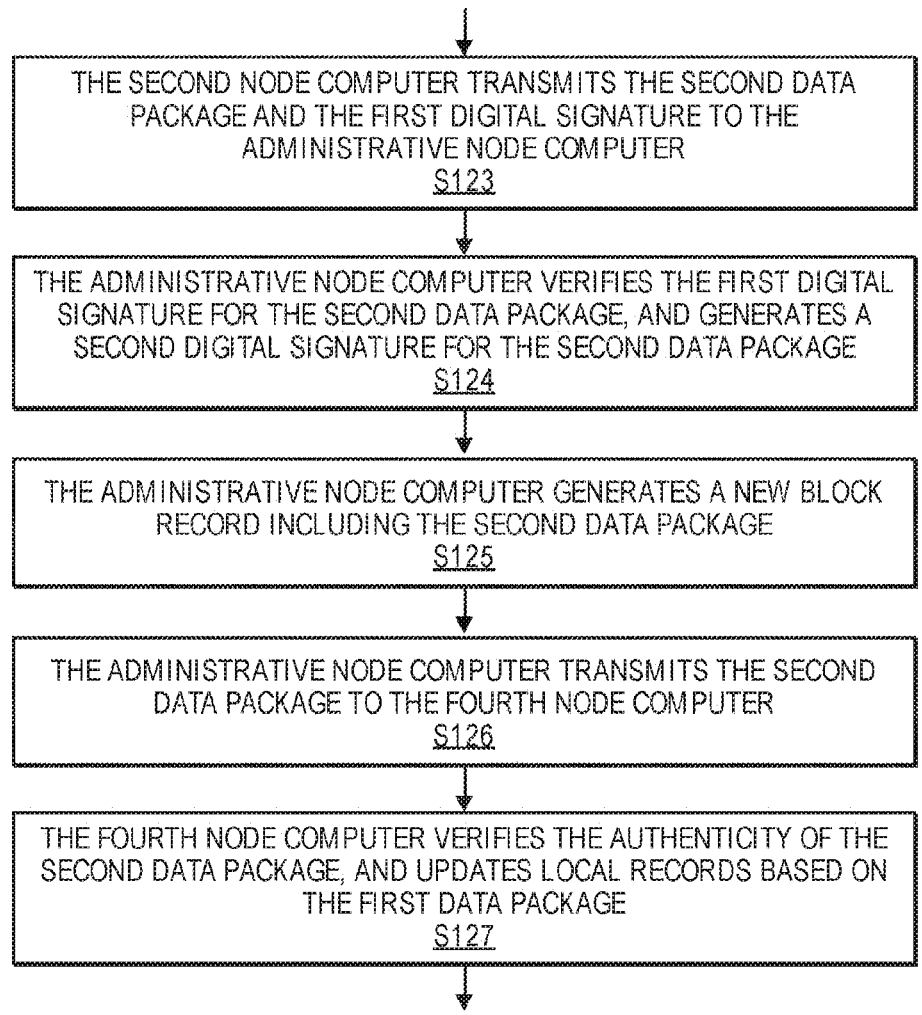
Figure 5F:
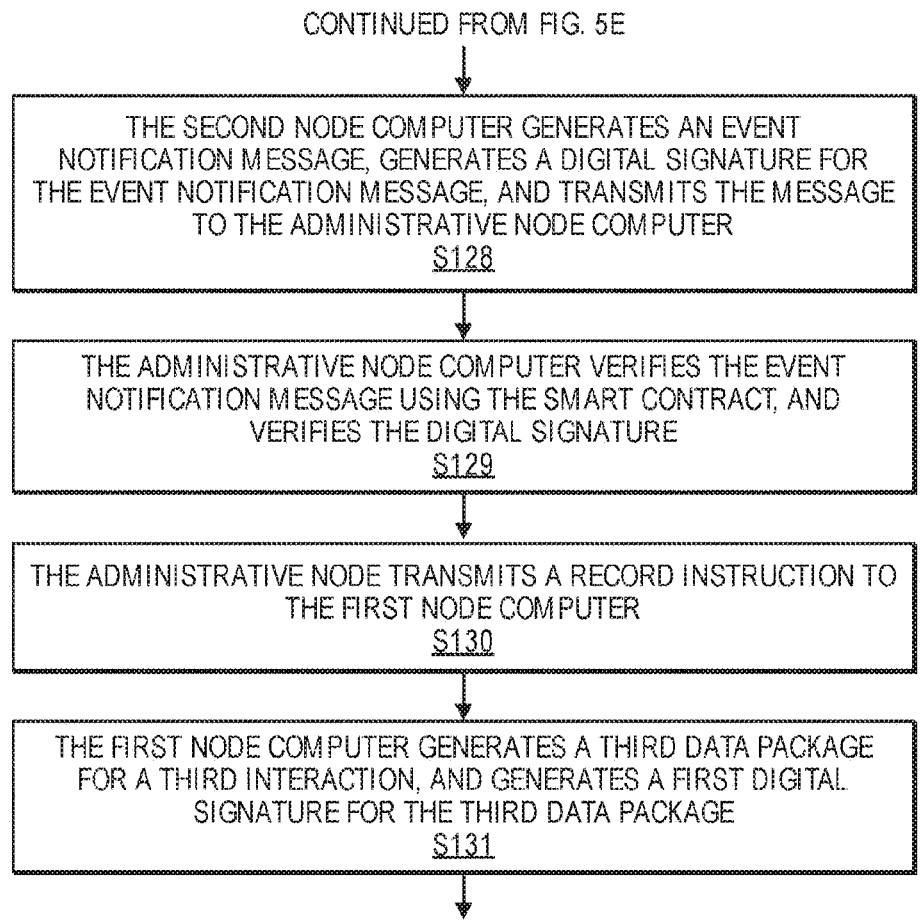
Figure 5G:
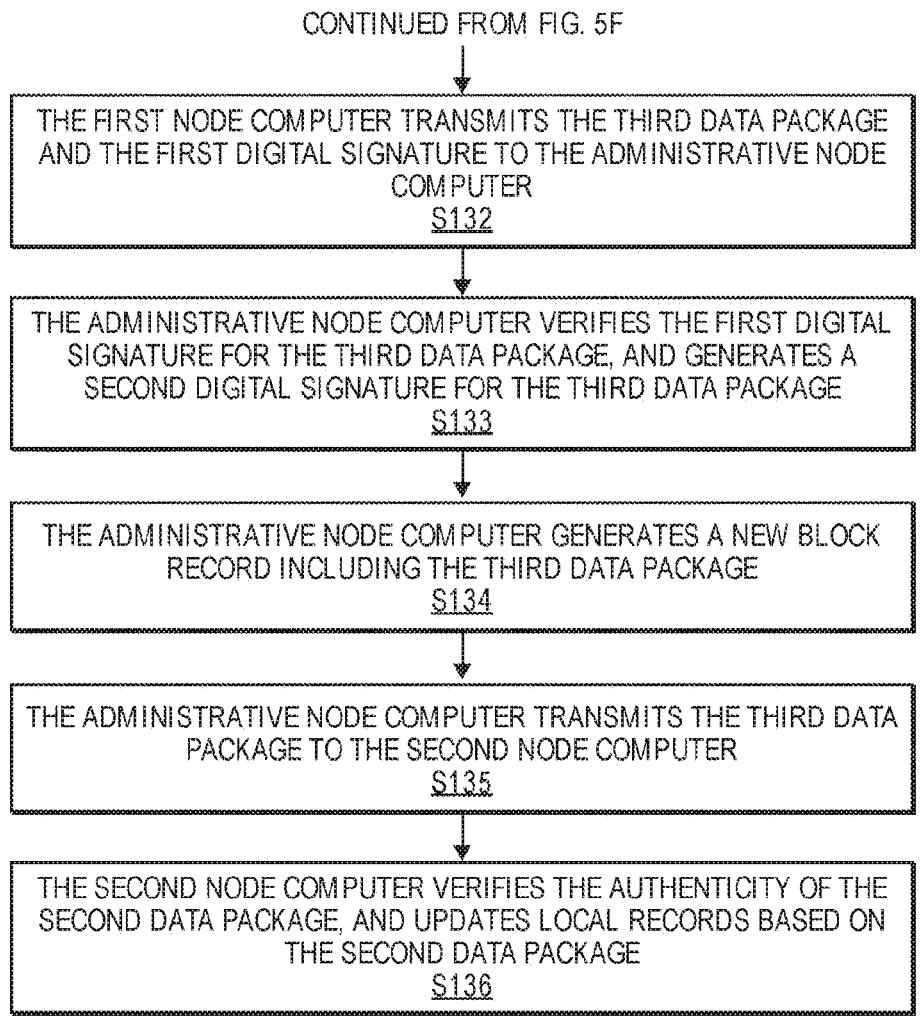

An example of a second node computer 145, according to some embodiments of the invention, is shown in FIG. 3. The second node computer 145 comprises a processor 145A, a network interface 145B, an identifier database 145C, a key database 145E, and a computer readable medium 145F.

The identifier database 145C can store information about the second node computer's identifiers, such as an address identifier and one or more class identifiers. The identifier database 145C may also include information about one or more users, such as an enterprise identifiers, an associated class type, and/or a user account.

The key database 145E can store encryption keys. For example, the key database 145E can include a private key associated with the second node computer 145, as well as a public key associated with the administrative node computer 150. In some embodiments the key database 145E can take the form of a hardware security module (HSM).

The computer readable medium 145F may comprise an enrollment module 145G, a user enroll module 145K, a data package module 145L, a node lookup module 145M, a value analysis module 145N, a signing module 145P, a record submission module 145Q, a smart contract module 145R, a validation module 145T, and any other suitable software module. The computer readable medium 145F may also comprise code, executable by the processor 145A for implementing a method comprising generating a smart contract indicating that an ordered set of interactions will take place in response to an ordered set of events; in response to a first event of the ordered set of events, generating a first data package for a first interaction of the ordered set of interactions, wherein the smart contract indicates that the first interaction will take place in response to the first event; transmitting the first data package to an administrative node computer, wherein the administrative node computer generates a first block for a blockchain, the first block including the first data package; in response to a second event of the ordered set of events, generating a second data package for a second interaction of the ordered set of interactions, wherein the smart contract indicates that the second interaction will take place in response to the second event; and transmitting the second data package to the administrative node computer, wherein the administrative node computer creates a second block for the blockchain, the second block including the second data package.

The enrollment module 145G may comprise code that causes the processor 145A to enroll with the administrative node computer 150 for participation in the recording network. For example, the enrollment module 145G may contain logic that causes the processor 145A to send an enrollment request message including information about the second node, such as an address, a bank identifier, a settlement account, and/or any other suitable information. The enrollment module 145G also include instructions for receiving and storing an address identifier, an administrative node public key, a second node private key, one or more class identifiers, and any other suitable enrollment information from the administrative node computer 150.

The user enroll module 145K may comprise code that causes the processor 145A to facilitate enrollment of end users. For example, the user enroll module 145K may contain logic that causes the processor 145A to provide user information (e.g., a name, a residential and/or business address, a date of birth, a phone number, an account number, an account username, an account password, an email address, a government-issued identification number such as a driver's license number, passport number, or social security number, etc.) to the administrative node computer 150. The second node computer 145 can also receive and store an enterprise identifier for the second user computer 130 from the administrative node computer 150, and provide the enterprise identifier to the second user computer 130.

The data package module 145L may comprise code that causes the processor 145A to generate a new data package. For example, the data package module 145L may contain logic that causes the processor 145A to receive an instruction from the second user computer 130 and/or the administrative node computer 150, and to create a data package for an interaction based on the instruction. The data package can include any suitable information for entering a new record into a ledger. In the example of payment transactions, the data package can include information about the sending account, the receiving account, the sending currency class type, the receiving currency class type, a currency exchange rate, and/or any other suitable information.

The node lookup module 145M may comprise code that causes the processor 145A to identify a node based on a user. For example, the node lookup module 145M may contain logic that causes the processor 145A to identify the third node computer 123 based on the third user computer 133 being indicated as a transaction recipient. For example, the third node's address identifier may be identified based on a subset of characters included in the third user's enterprise identifier, or the address identifier can be associated with the third user's enterprise identifier in a database (e.g., a database accessed at the administrative node computer 150). The node lookup module 145M can also include instructions for adding an identified address identifier to a new data package.

The value analysis module 145N may comprise code that causes the processor 145A to determine a value for an interaction. For example, the value analysis module 145N may contain logic that causes the processor 145A to determine a first amount in a first currency that will be charged to the second user in order to deliver a second amount in a second currency to the third user. This determination can include looking up a current foreign exchange rate and calculating transfer fees (e.g., both of which can be provided by the administrative node computer 150). The amount debited in the first currency, the information about the amount credited in the second currency, the currency exchange rate, and/or the fees assessed can be included in a new data package.

The signing module 145P may comprise code that causes the processor 145A to create a digital signature. For example, the signing module 145P may contain logic that causes the processor 145A to apply a private key and a mathematical algorithm to a data package, such that the digital signature is generated for the data package. The second node computer's digital signature can serve as evidence that it truly was the second node computer 145 that created and submitted the data package.

The record submission module 145Q may comprise code that causes the processor 145A to submit a new data package with new interactions for recording. For example, the record submission module 145Q may contain logic that causes the processor 145A to send a new data package, an associated digital signature, and/or any other suitable information to the administrative node computer 150.

The smart contract module 145R may comprise code that causes the processor 145A to generate a smart contract. The smart contract can include information about an ordered series of events and an ordered series of responses (e.g., interactions). The smart contract module 145R may also contain logic that causes the processor 145A to communicate with other parties (e.g., the first node computer 165) associated with the smart contract to reach a consensus about the smart contract details, to digitally sign a smart contract, and to transmit the smart contract to a central administrator. In some embodiments, the smart contract module 145R may comprise code that causes the processor 145A to perform tasks associated with a new smart contract, such as placing a hold on account funds based on payments defined in the smart contract.

In addition to creating and sending data packages (e.g., for sending a payment to the third node computer), the second node computer 145 may also be able to verify the authenticity of data packages submitted by other nodes. For example, the first node computer 165 may submit a data package to the administrative node computer 150 (e.g., for sending a payment to the second node computer), and the second node computer 145 may verify that the data package is authentic.

For example, the computer readable medium may comprise a validation module 145T, which may comprise code that causes the processor 145A to validate a new data package. The second node computer 145 can validate that a new data package is authentic in one or more manners. For example, the second node computer 145 can verify that the sending node computers digital signature and the administrative node computer's signature for the data package are both authentic (e.g., using their respective public keys). In some embodiments, the second node computer 145 can verify the authenticity of an interaction and/or data package by accessing a central record (e.g., a blockchain record), and confirming that the interaction and/or data package has been added to the records. The second node computer 145 can also inform the second user computer 130 about the new interaction data in the data package.

In some embodiments, the second node computer 145 can provide additional services to a user beyond communicating with the recording network. For example, the second node computer 145 can be a computer associated with a financial institution, a hospital, a government agency, an academic institution, a mobile phone service provider, or any other suitable service provider. Accordingly, in some embodiments, the second node computer 145 can maintain an account on behalf of the user. The account may store identity information, medical records, academic records, financial information, or any other suitable details depending on the type of service provider.

In embodiments where the second node computer 145 is associated with a financial institution, the second node computer 145 may store value on behalf of the user. The second node computer 145 may also be able to provide value (e.g., provide a payment) and/or receive value (e.g., receive a payment) on behalf of the user. An example of a financial institution is an issuer, which may typically refer to a business entity (e.g., a bank) that issues and maintains an account (e.g., a bank account) for a user. Another example of a financial institution is an acquirer, which may typically be a business entity (e.g., a commercial bank) that has a business relationship with a particular resource provider or other entity. Some entities can perform both issuer and acquirer functions. Some embodiments may encompass such single entity issuer-acquirers.

In some embodiments, when the first node computer 165 (or other node) sends a data package for a payment to the second node computer 145, the second node computer 145 may have a high-level of trust that a promised value will be delivered. For example, the second node computer 145 may be assured of the value because of two valid digital signatures, because the interaction data is included in a blockchain record, because the data package includes several associated identifiers (e.g., a class identifier and/or an address identifier), and/or because of any other suitable evidence. As a result, the second node computer 145 may make a value indicated in a received data package immediately usable (e.g., withdrawable) in the second user's account, even if the value has not yet been settled and received. Additionally, the second node may have a high-level of trust in the administrative node, as the administrative node may be a large, trusted central entity.

In some embodiments, the second node computer 145 can be representative of multiple associated computers. For example, the functionality described above for network participation and the functionality associated with banking services can be divided among several cooperative computers.

Referring back to FIG. 1, the other node computers (e.g., the first node computer 165, the third node computer 123, the fourth node computer 124, the fifth node computer 125, the sixth node computer 126, the seventh node computer 127, the eighth node computer 128, the ninth node computer 129) can, as mentioned above, participate in the recording network. For example, each node computer can be enrolled into the recording network, each node computer can be associated with a unique address identifier, and each node computer can be associated with a different private key. Similarly, each user (for each user computer) can be enrolled and associated with a unique enterprise identifier.

In some embodiments, one or more of the other node computers can include some or all of the functionality described above with respect to the second node computer 145. For example, one or more of the node computers can be configured to receive information about a new interaction (e.g., via a data package) on behalf of an associated user computer. Additionally, one or more of the node computers can submit data packages with new interaction data to the recording network on behalf of an associated user computer. Further, each node computer can digitally sign messages using a private key.

Similar to the second node computer 145, the other nodes computers can each be associated with a different bank or other suitable service provider. As a result, the each node computer can host a user account, and can store and receive a value on behalf of a user, as well as send a value on behalf of a user.

A user can be an individual, a business, an organization's record-updating administrator, or any other suitable type of user. For example, a first user can be an individual, and a second user can be a resource provider (e.g., a merchant) that engages in transactions and can sell goods or services, or provide access to goods or services. Further, the third user through ninth user can each be different service providers that facilitate aspects of international shipping, such as a freight service, a customs authority, an insurance contract developer, a harbor service, a storage service, or any other suitable entity. Such users can complete tasks involved in the shipping of goods.

An example of a smart contract 400 is shown in FIG. 4. As shown, the smart contract 400 can include a smart contract identifier 401, such as an alphanumeric code or the like. The smart contract 400 can include information about a series of predefined trigger events 403 and a series of predefined responses 404. In some embodiments, each response can be paired with a specific trigger event, such that the response occurs after that trigger event. Additionally, the smart contract 400 can specify an order 402 for the trigger events 403 and responses 404. If a certain trigger event occurs out of order, the corresponding response may not take place, and/or any remaining responses may be canceled.

Embodiments of the invention allow smart contracts with ordered events to be applied to any suitable process and/or record-keeping scenario. In this example, the trigger events 403 include a series of activities, each performed by a different actor (e.g., a different user or user computer). Also, in this example, the responses 404 include generating a series of data packages. A data package can include information for entering into a record (e.g., a blockchain record).

As described in more detail below, a triggering event can include receiving a notification that an activity was completed. For example, the predefined actor can send a notification message that the activity was completed, and the notification message can be considered valid (and thereby trigger the response) if it is accompanied by a digital signature associated with the actor (e.g., the actor's computer).

As mentioned above, in some embodiments, the recording system may utilize a blockchain. Each block in the blockchain may include information about one or more interactions (e.g., from one or more data packages). A blockchain ledger may be unalterable without detection. This ensures that any tampering of information related to transactions, such as an attempt to reassign a transaction value to an inappropriate entity, will not go unnoticed. Together, a block header and a block body that includes the transaction information (e.g., and any other suitable information) can make up a block.

Embodiments of the invention improve the process for creating and organizing a blockchain by introducing the ordered smart contract. The smart contract can effectively act as a gatekeeper for new blockchain entries, ensuring that inappropriate (e.g., out of order) records are not entered into the blockchain. This preventative measure is useful because once data is entered into a blockchain, it typically cannot be removed.

A method 500 according to embodiments of the invention can be described with respect to FIGS. 5A-5G. Some elements in other Figures are also referred to. The steps shown in the method 500 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

A first user (e.g., a buyer) and second user (e.g., a supplier) may agree to an interaction. The interaction can include the first user providing payment (e.g., $1,500,000) to the second user in exchange for goods. The first user and second user may be located in different locations (e.g., different countries), and thus the second user may arrange for delivery of the goods to the first user.

The process for delivering the goods can involve a number of service providers, such as a domestic delivery service, an international shipping service, a foreign delivery service, an insurance contract preparation service, domestic and foreign customs inspection services, etc. Each of these service providers may perform their services in exchange for a payment from the second user, and thus a number of additional interactions (e.g., between the second user and each service provider) may be necessary for completing the original interaction between the second user and the first user.

In some embodiments, the second user (e.g., via a second user computer 130) can determine exactly which service providers will be used for delivering the goods, as well as the order in which they will perform their services. The second user may also reach an agreement with each service provider about the payment amounts and types of currency that will be provided in exchange for their services (e.g., ¥35000 for a first service provider, ¥12000 for a second service provider, ¥57000 for a second service provider, $3400 for a fourth service provider, $6850 for a fifth service provider, etc.).

The second user can then (e.g., via the second user computer 130) provide some or all of the payment and shipping information to the second node computer 145, such that the second node computer 145 can orchestrate the payment processes on behalf of the second user. This may include providing the second node computer 145 with enterprise identifiers for each user (e.g., the first user and each service provider).

The second node computer 145 may then determine a node computer (e.g., a node computer's address identifier) associated with each enterprise identifier. For example, a first node computer 165 may be associated with the first user's enterprise identifier, a third node computer 123 may be associated with one service provider's enterprise identifier, a fourth node computer 124 may be associated with another service provider's enterprise identifier, etc. In some embodiments, the second node computer 145 can communicate with the administrative node computer 150 to inquire about what nodes are associated with each enterprise identifier. In some embodiments, the second node computer 145 can use a locally stored lookup table for identifying a node associated with each enterprise identifier. In other embodiments, the second node computer 145 can parse each enterprise identifier to determine each node computer's address identifier.

Having obtained information about each transaction (e.g., each payment provider, each payment receiver, each payment amount), each shipping service that is to be performed in exchange for each payment, and the node computers with which to communicate, the second node computer 145 can proceed to establish a smart contract that governs the entire process.

At step S101, the second node computer 145 can generate a smart contract. The smart contract can specify an ordered set of events (e.g., shipping-related services) that are expected to take place. The smart contract can also include information specifying an ordered set of interactions that are to take place in response to the ordered set of events. In this case, each interaction can be a payment transaction between a sending account and a receiving account. Each different transaction may indicate a different receiving account. The smart contract can specify that each interaction should only be triggered if its corresponding event occurred in the correct order.

While the smart contract may be identifiable based on the ordered series of events and/or the ordered series of interactions, in some embodiments, the second node computer 145 can assign a smart contract identifier (e.g., an alphanumeric value) to the smart contract. In other embodiments, the administrative node computer 150 can assign a smart contract identifier to the smart contract at a later point in time.

Additionally, the second node computer 145 can place a hold on a second user account. For example, a total amount to be paid by the second user can be calculated. This can be done by summing the amounts of all the payments where the second user is the payment provider. The second node computer 145 can verify that the second user has sufficient funds available to complete all of these payments, and can further place a hold on the funds needed for each payment such that the funds are available when the payments are made.

At step S102, the second node computer 145 can generate a digital signature for the smart contract. The digital signature can be created using a private key associated with the second node computer 145. In some embodiments, the digital signature can serve as an indication that the second node computer 145 approves of the smart contract and/or that the second node computer 145 has reserved funds needed for each payment that the second user is promising.

At step S103, the second node computer 145 can transmit the smart contract and/or the digital signature to the administrative node computer 150. As a result, the administrative node computer 150 can receive the smart contract which indicates that an ordered set of interactions will take place in response to an ordered set of events.

At step S104, the administrative node computer 150 can transmit a copy of the smart contract to the first node computer 165 to obtain the first node computers approval of the smart contract. For example, the administrative node computer 150 can analyze the smart contract to determine which entities are indicated as responsible for sending one or more payments. The administrative node computer 150 may then seek confirmation from each payment sender. In this case, the payment senders include the second node computer 145 (on behalf of the second user) and the first node computer 165 (on behalf of the first user). As the second node computer 145 may have already provided a digital signature, the administrative node computer 150 may only seek an additional digital signature from the first node computer 165.

Additionally, the administrative node computer 150 can verify the second node computer's digital signature, for example using a public key associated with the second node computer 145. Further, the administrative node computer 150 can digitally store the smart contract and/or the first node computer's digital signature (e.g., in a smart contract database).

At step S105, the first node computer 165 can determine whether to agree with the smart contract. For example, the first node computer 165 may inform the first user (e.g., via the first user computer 110) about payments which would be drawn from the first user's account, about the shipment details (e.g., goods to be provided and delivery timeline), and about any other suitable details indicated by the smart contract.

If the first user approves of the smart contract details, the first node computer 165 can generate a digital signature for the smart contract, for example using a private key associated with the first node computer 165. Additionally, the first node computer 165 can place a hold on the first user's account for the amount of the payment to the second user for the goods (and for the amounts of any other payments for which the first user is responsible).

The first node computer 165 can then transmit the digital signature to the administrative node computer 150 along with a message indicating that the first node computer 165 approves of the smart contract.

The administrative node computer 150 can verify the first node computer's digital signature, for example using a public key associated with the first node computer 165. Further, the administrative node computer 150 can digitally store the first node computer's digital signature (e.g., along with the smart contract and second node computer's digital signature). Having obtained approval from both of the payment senders indicated by the smart contract and/or having confirmed that the payment amounts are available and being held, the administrative node computer 150 can consider the smart contract to be validated and in operation.

At step S106, the administrative node computer 150 can transmit notifications to each node computer about the newly created smart contract. For example, the administrative node computer 150 can transmit a message to the third node computer 123 informing the third node computer 123 that a payment (of a specific amount) will be provided by the second user to the third user if the third user performs a specific task. The third user may be a domestic delivery service, and the task may be collecting the goods from a second user warehouse and delivering the goods to a shipping harbor. The third node computer 123 can in turn provide this information to the third user computer 133. Similar messages can be sent to each other node computer and user computer. As a result, each user can be informed about their respective shipping-related task, and can be assured that they will receive a payment if they complete their task.

In some embodiments, each node computer and user computer is only informed about interactions and/or events with which they are associated. For example, the third user computer 133 may not receive any information about payments received by or shipping tasks performed by the fourth user computer 134. Additionally, in some embodiments, the node computers may be able to communicate with the administrative node computer 150 to view (their portion of) smart contracts that are in effect.

At step S107, the second user (e.g., via the second user computer 130) can initiate a process in response to the establishment of the smart contract. For example, the second user can package the goods, and provide the goods to the third user (e.g., a domestic delivery service). This can initiate the delivery process and set the ordered series of events into effect.

At step S108, the third user can cause a first event to take place. For example, the third user can perform a first action or task, such as transporting the goods from a second user warehouse to a shipping harbor.

After the first event is completed, the third user can (e.g., via the third user computer 133) report that the task is done. The third user computer 133 can transmit an event completion message to the third node computer 123.

At step S109, the third node computer 123 can generate an event notification message indicating that the first event has taken place (e.g., a task is complete). The message can include information describing the event and when it was completed, as well as any suitable proof that the event is complete (e.g., a receipt, a photograph, etc.). The message may additionally include the smart contract identifier.

In some embodiments, the message can also include information about the first interaction that is to take place in response to the first event, as indicated by the smart contract. In this manner, the event completion notification can also or instead serve as a payment request message by providing information about a payment amount, a payment provider (e.g., the second user), and a payment recipient (e.g. the third user).

Additionally, the third node computer 123 can generate a digital signature for the event notification message, for example using a private key associated with the third node computer 123. Further, the third node computer 123 can transmit the event notification message and/or the digital signature to the administrative node computer 150.

In some embodiments, in order to ensure that the event completion message (and event notification message) is only sent when the first event has taken place, the event completion message may be sent in response to a technological trigger. For example, the event completion message may be sent when the third user (e.g., a service personnel or delivery truck) arrives at the delivery destination (e.g., a shipping harbor). The third user's location can be tracked and determined through a mobile device, vehicle, or other device equipped with location-tracking technology (e.g., GPS). A third user mobile device can be in communication with the third user computer 133, the third node computer 123, and/or the administrative node computer 150 in order to transmit current location data. As a result, the event completion may not be transmitted before the third user has arrived at the delivery destination.

In further embodiments, instead of the third user computer 133 and third node computer 123, the fourth user computer 134 and/or fourth node computer 124 can report that the first event is complete. This way, the event is only reported as complete when the fourth user can verify that the third user completed their task (e.g., the third user provided the goods to the fourth user).

The administrative node computer 150 may receive the event notification message, and then may identify the smart contract (e.g., from among other smart contracts stored in a smart contract database) associated with the message. For example, a stored smart can be identified based on a smart contract identifier included in the notification message, or based on the event and/or interaction described in the notification message.

At step S110, the administrative node computer 150 verifies the event notification message based on the smart contract. For example, the administrative node computer 150 can verify that that the event reported in the event notification message matches the next expected event according to the smart contract. In the case of the first event, the administrative node computer 150 can verify that the reported event is supposed to occur first (e.g., before all other events) within the smart contract's ordered set of events.

The administrative node computer 150 can also verify that the event completion is being reported by the third node computer 123 by verifying the third node computer's digital signature (e.g., using a public key associated with the third node computer).

In some embodiments, the administrative node computer 150 may not consider the event completion notification sent by the third node computer 123 to be valid until the fourth user computer 134 and/or fourth node computer 124 confirms that they have received the goods from the third user and/or confirms that the event was completed.

Once the administrative node computer 150 determines that the first event has taken place, the administrative node computer 150 can mark the first event as complete. For example, the notification message or other completion indication can be stored in the smart contract database along with the smart contract.

Additionally, the administrative node computer 150 can determine a first interaction that is to take place in response to the completion of the first event. This can include analyzing the smart contract to identify an interaction associated with the event, and/or analyzing the notification message to identify an interaction being requested. In this example, the interaction is a payment by the second user to the third user. The administrative node computer 150 can thereby identify the user and node computer (e.g., the second node computer 145) responsible for sending the payment for the interaction.

At step S111, the administrative node computer 150 can generate and transmit a record instruction message to the second node computer 145. In this case, the record instruction can be an instruction to create a data package representing the first interaction (e.g., a payment from the second node to the third node), such that the data package can be recorded into a ledger of transactions. In some embodiments, the administrative node computer 150 can also or instead inform the second node computer 145 that the first event has taken place, and the second node computer 145 can determine which payment to perform based on the smart contract.

At step S112, the second node computer 145 generates a data package representing the first interaction of the ordered set of interactions. The data package can be formatted such that it can be incorporated into a transaction ledger, which may be a blockchain record. In this case, the data package can include any suitable information detailing the payment transaction, such as the agreed upon transaction amount, the currency type, information identifying the sending account (e.g., the second user's account), information identifying the receiving account (e.g., the third user's account), the second user computer's enterprise identifier, the third user computer's enterprise identifier, the second node computer's address identifier and/or class identifier, the third node computer's address identifier and/or class identifier, and/or any other suitable information.

In some embodiments, the data package can also include the smart contract identifier, such that the data package can later be identified (e.g., within a blockchain record) using the smart contract identifier.

Additionally, the second node computer 145 can generate a first digital signature for the data package. For example, the second node computer 145 can generate a one-way hash using some or all of the information in the data package, and then encrypt the hash using a private key. The hash data value and/or digital signature may be attached to the data package, thereby making the data package data-tampering evident.

At step S113, the second node computer 145 transmits the data package for the first interaction and the first digital signature to the administrative node computer 150 for validation and entering into a blockchain record.

At step S114, the administrative node computer 150 can verify the second node computer's digital signature and/or hash value. For example, the administrative node computer 150 may perform a checksum procedure for the hash value. This can include generating a second hash value based on the data package and checking that the second hash value matches the received hash value. The administrative node computer 150 may verify the digital signature using the second node computer's public key. The administrative node computer 150 can reject the data package if the hash or digital signature cannot be verified.

The administrative node computer 150 can also verify that the second node computer's class identifier and address identifier are both valid, associated with the second node computer 145, and being used appropriately. If these and any other suitable verification steps are successfully completed, the administrative node computer 150 can consider the data package valid, and the administrative node computer 150 can generate a second digital signature for the data package (e.g., using a private key associated with the administrative node computer 150).

At step S115, the administrative node computer 150 can add information about the first interaction (and/or the entire data package) to a record. For example, the administrative node computer 150 can create a new block for a blockchain, the block including the data package for the first interaction and the digital signatures. The block may also include other unrelated data packages that were received in a similar timeframe (e.g., the block may include all data packages received in a 10 minute period).

At step S116, the administrative node computer 150 can transmit a copy of the data package to the third node computer 123 (e.g., to inform the third node computer 123 about the transaction). The administrative node computer 150 can also make the blockchain record accessible to the third node computer 123.

At step S117, the third node computer 123 can verify the authenticity of the data package. For example, the third node computer 123 can confirm that the data package has been entered into the blockchain record (e.g., by accessing the blockchain record at the administrative node computer 150). The third node computer 123 can also verify that the data package includes two digital signatures; one from the second node computer 145, and one from the administrative node computer 150. The third node computer 123 can also verify the digital signatures (e.g., using the appropriate public keys). All of these verifications, in combination, can create a high-level of trust in the authenticity of the data package, as well as a high-level of trust that a promised interaction will be completed.

Additionally, the third node computer 123 can update its local records based on the data package. For example, the third node computer 123 can credit the promised transaction value (e.g., as indicated in the data package) to the third user's bank account.

The process for completing an event and executing an interaction (e.g., a payment) in response to the event, as described above in steps S108-S117, can be repeated in a similar manner for another event and interaction in steps S118-S127. For example, when the third user completed the first event (in step S108), the third user may have provided the package of goods to a fourth user. The fourth user may be identified in the smart contract as a service provider that will cause a second event involving the goods, and the smart contract may also identify the second event as a trigger for a second interaction.

For example, at step S118, which can be similar to step S108, the fourth user can cause a second event to take place. For example, the fourth user may be a domestic customs inspector, and the fourth user may perform the task of inspecting the goods and clearing the goods for export. The fourth user can (e.g., via the fourth user computer 134) also report that the task is done to the fourth node computer 124. In some situations, the second event might happen hours or days after the first event.

At step S119, which can be similar to step S109, the fourth node computer 124 can generate an event notification message indicating that the second event has taken place (e.g., a second task is complete), as well as generate a digital signature for the message (e.g., using a private key associated with the fourth node computer 124). The fourth node computer 124 can transmit the event notification message and/or the digital signature to the administrative node computer 150.

At step S120, which can be similar to step S110, the administrative node computer 150 verifies the event notification message based on the smart contract. For example, the administrative node computer 150 can verify that that the event reported in the event notification message is the next expected event according to the smart contract. In the case of the second event, the administrative node computer 150 can verify that the reported event is supposed to occur second (e.g., after a first event and before all other events) within the smart contract's ordered set of events. This can include verifying that preceding events (in this case, just the first event) have been marked as completed.

The administrative node computer 150 can also verify the fourth node computers digital signature (e.g., using a public key associated with the fourth node computer), and the administrative node computer 150 can mark the second event as complete.

Additionally, the administrative node computer 150 can determine a second interaction that is to take place in response to the completion of the second event. In this example, the interaction is a payment by the second user to the fourth user.

At step S121, which can be similar to step S111, the administrative node computer 150 can generate and transmit a record instruction message to the second node computer 145. In this case, the record instruction can be an instruction to create a data package representing the second interaction (e.g., a payment from the second node to the fourth node), such that the data package can be recorded into a ledger of transactions.

At step S122, which can be similar to step S112, the second node computer 145 generates a second data package representing the second interaction of the ordered set of interactions. In this case, the second data package can include any suitable information detailing the payment transaction, such as the agreed upon transaction amount, the currency type, information identifying the sending account (e.g., the second user's account), information identifying the receiving account (e.g., the fourth user's account), the second user computer's enterprise identifier, the fourth user computer's enterprise identifier, the second node computer's address identifier and/or class identifier, the fourth node computer's address identifier and/or class identifier, and/or any other suitable information. Additionally, the second node computer 145 can generate a digital signature for the second data package.

At step S123, which can be similar to step S113, the second node computer 145 transmits the second data package for the second interaction and the accompanying digital signature to the administrative node computer 150 for validation and entering into a blockchain record.

At step S124, which can be similar to step S114, the administrative node computer 150 can verify the second node computer's digital signature and/or hash value. If this and any other suitable verification steps are successfully completed, the administrative node computer 150 can generate a second digital signature for the second data package.

At step S125, which can be similar to step S115, the administrative node computer 150 can add information about the second interaction (and/or the entire data package) to a record. For example, the administrative node computer 150 can create a new block for a blockchain, the block including the second data package for the second interaction and the associated digital signatures. The block may also include other unrelated data packages (e.g., for other unrelated shipment processes) that were received in a similar timeframe (e.g., the block may include all data packages received in a 10 minute period). Additional blocks may have been created during the time elapsed between steps S115 and S125. As a result, the blockchain may include multiple interceding blocks between the block created in step S115 and the block being created in step S125.

At step S126, which can be similar to step S116, the administrative node computer 150 can transmit a copy of the data package to the fourth node computer 124.

At step S127, which can be similar to step S117, the fourth node computer 124 can verify the authenticity of the data package. Additionally, the fourth node computer 124 can update its local records based on the data package. For example, the fourth node computer 124 can credit the promised transaction value (e.g., as indicated in the second data package) to the fourth user's bank account.

Thus, two separate events and two separate corresponding interactions can take place as predefined in a smart contract. This event and interaction process (as described for a first event and first interaction in steps S108-S117, and again described fora second event and second interaction in steps S118-S127), can repeat for each event-interaction pair specified in the smart contract.

For example, the shipping process may involve additional transportation segments, additional customs inspections, steps for creating an insurance policy, etc., and each of these additional tasks may be performed by an additional service provider. FIG. 1 shows seven such service providers (represented by the third user computer 133 through the ninth user computer 139), but any suitable number of service providers and corresponding smart contract entries can be present. Thus, there may be another one, three, five, or more iterations of the event and interaction process (e.g., as described above for steps S108-S117) for additional service providers.

The last shipping event may be delivering the goods to the first user (e.g., a first user warehouse). This can trigger the last second user-provided payment, which can be sent to the final delivery service. Additionally, the second node computer 145 can determine (or be notified) that the goods have been successfully delivered. As a result, the second user may have effectively completed the original task of sending a package of goods to the first user. Thus, in addition to the last delivery triggering the last second user-provided payment, it may also trigger the final payment which is sent by the first user (e.g., the buyer of the goods) to the second user (e.g., the supplier of the goods).

At step S128, which can be similar to step S109, the second node computer 145 can generate an event notification message indicating that the final event has taken place (e.g., the shipping process is complete), as well as generate a digital signature for the message. The second node computer 145 can transmit the event notification message and/or the digital signature to the administrative node computer 150.

At step S129, which can be similar to step S110, the administrative node computer 150 verifies the event notification message based on the smart contract. For example, the administrative node computer 150 can verify that that the event reported in the event notification message is the next expected event according to the smart contract. In the case of the final event, the administrative node computer 150 can verify that all events have been completed, and that the smart contract indicates an additional interaction should take place when all the events have been confirmed as complete (e.g., in addition to an interaction that may have already taken place for the last service provider).

Additionally, the administrative node computer 150 can determine the final (e.g., third or later) interaction that is to take place in response to the completion of the final (e.g., third or later) event. In this case, the interaction is a payment by the first user to the second user.

At step S130, which can be similar to step S111, the administrative node computer 150 can generate and transmit a record instruction message to the second node computer 145. In this example, the record instruction can be an instruction to create a data package representing the final interaction (e.g., a payment from the first node to the second node), such that the data package can be recorded into a ledger of transactions.

At step S131, which can be similar to step S112, the first node computer 165 generates a final (e.g., third or later) data package representing the third interaction of the ordered set of interactions. In this case, the third data package can include any suitable information detailing the payment transaction, such as the agreed upon transaction amount (e.g., $2,000,000), the currency type, information identifying the sending account (e.g., the first user's account), information identifying the receiving account (e.g., the second user's account), the first user computer's enterprise identifier, the second user computer's enterprise identifier, the first node computer's address identifier and/or class identifier, the second node computer's address identifier and/or class identifier, and/or any other suitable information. Additionally, the first node computer 165 can generate a digital signature for the final data package.

At step S132, which can be similar to step S113, the first node computer 165 transmits the final data package for the final interaction and the accompanying digital signature to the administrative node computer 150 for validation and entering into a blockchain record.

At step S133, which can be similar to step S114, the administrative node computer 150 can verify the first node computer's digital signature and/or hash value. If this and any other suitable verification steps are successfully completed, the administrative node computer 150 can generate an additional digital signature for the final data package.

At step S134, which can be similar to step S115, the administrative node computer 150 can add information about the final interaction (and/or the entire data package) to a record. For example, the administrative node computer 150 can create a new block for a blockchain, the block including the final data package for the final interaction and the associated digital signatures. The block may also include other unrelated data packages that were received in a similar timeframe (e.g., the block may include all data packages received in a 10 minute period).

At step S135, which can be similar to step S116, the administrative node computer 150 can transmit a copy of the data package to the second node computer 145.

At step S136, which can be similar to step S117, the second node computer 145 can verify the authenticity of the data package. Additionally, the second node computer 145 can update its local records based on the data package. For example, the second node computer 145 credit the promised transaction value (e.g., as indicated in the second data package) to the second user's bank account.

At a later time, steps can be taken to settle the transaction amounts for each of the payment transactions (e.g., between settlement accounts for each pair of nodes) based the data package records stored in the blockchain ledger (e.g., at steps S115, S125, and S134). In some embodiments, batch settlement can happen at the end of the day, and multilateral settlement can take place across the network. In some embodiments, each transaction can be settled using two atomic settlement steps (e.g., transfer from sender account to central bank account, and then transfer from central bank account to receiver account).

Accordingly, a single smart contract can guide an entire process (e.g., a shipping process) that can includes multiple sequential events, and includes creating multiple record entries representing multiple sequential interactions in response the events.

Some embodiments of the invention can include additional or alternative details to some aspects of the above-described method. For example, at step S104, the administrative node computer 150 can optionally add the smart contract to the blockchain (e.g., by creating a new block that includes the smart contract). However, other embodiments may not store the smart contract in the blockchain, for example because the blockchain may only be used to store interaction data. The smart contract may already be sufficiently enforceable and trustworthy without adding it to the blockchain (e.g., based on a trusted central administrator controlling the smart contract and account values being held).

Additionally, in some embodiments, instead of the administrative node computer 150 communicating with the first node computer 165 to obtain a digital signature for the smart contract (e.g., at step S104), the second node computer 145 may communicate with the first node computer 165 for that purpose. For example, the second node computer 145 and the first node computer 165 can communicate to come to an agreement on the details of the smart contract, the first node computer 165 can provide a digital signature to the second node computer 145, and then the second node computer 145 can transmit the smart contract and both digital signatures to the administrative node computer 150 (e.g., at step S103).

Further, in some embodiments, the administrative node computer 150 can create data packages for transactions on behalf of the second node computer 145, provided the second node computer 145 has already agreed to the transactions via the smart contract. Thus, instead of sending a record instruction (e.g., at step S111), the administrative node computer 150 can generate the data package and execute the transaction directly.

As mentioned above, embodiments allow the first node computer 165 to perform some or all of the functions performed by the second node computer 145. For example, the first node computer 165 can generate the smart contract instead of the second node computer 145, the first node computer 165 can provide payments to each of the other node computers instead of the second node computer 145, etc. The terms "first" and "second" are used for explanatory purposes, and can be switched or modified in any suitable manner.

The method 500 was described above as a method for sending payments to service providers that participate in a shipping process. However, embodiments of the invention can also apply to other processes, and other types of recordkeeping. For example, embodiments can apply to other types of transaction for goods and services, and to other contexts such as medical contexts and constructions contexts. Embodiments of the invention can be used to ensure that steps in medical procedures or processing are performed in the correct order, to ensure that steps in construction projects or manufacturing projects are completed in a specified order, and/or to any other suitable ordered process or system.

Embodiments of the invention have a number of advantages. For example, in embodiments of the invention, a smart contract can specify multiple records (e.g., for interactions) to create in response to multiple triggering events. Further, the smart contract can specify an order for the events and records, an a central administrative node can make sure that the events occur in the correct order. As a result, new records are added to a blockchain in a predefined order (e.g., according to the smart contract). This enables a blockchain to be built in an orderly, organized, and logical manner. This also enables a viewer to trace the sequential records through the blockchain, thereby enabling the review of a completed process. This smart contract application is particularly useful for blockchain record systems, as blockchains typically cannot be modified after information is added, so it is valuable to filter information before it is added.

Embodiments of the invention also advantageously provide each participating node computer with a unique private key. As a result, notification message submitted by node computers can be digitally signed and verifiable. In some embodiments, a smart contract is triggered by event notifications from node computers, and the digital signatures increase security and reliability of this event triggering process.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by an administrative node computer, a smart contract indicating that an ordered set of interactions will take place in response to an ordered set of events, wherein the smart contract indicates that each interaction in the ordered set of interactions corresponds to an event in the ordered set of events, and wherein the smart contract indicates that each interaction in the ordered set of interactions will take place in response to a corresponding event only if the corresponding event occurs within a specific event order;
receiving, by the administrative node computer, a first notification that a first event of the ordered set of events has taken place;
verifying, by the administrative node computer, based on the smart contract, that the first event is supposed to occur first within the ordered set of events;
determining, by the administrative node computer, based on the smart contract, that a first interaction of the ordered set of interactions is to take place in response to the first event;
in response to the first event of the ordered set of events, transmitting, by the administrative node computer, to a second node computer, an instruction to generate a first data package for the first interaction of the ordered set of interactions, wherein the smart contract indicates that the first interaction will take place in response to the first event;
receiving, by the administrative node computer, from the second node computer, the first data package for the first interaction;
generating, by the administrative node computer, a first block for a blockchain, the first block including the first data package for the first interaction;
receiving, by the administrative node computer, a second notification that a second event of the ordered set of events has taken place;
verifying, by the administrative node computer, based on the smart contract, that the second event is supposed to occur second within the ordered set of events; and
determining, by the administrative node computer, based on the smart contract, that a second interaction of the ordered set of interactions is to take place in response to the second event;
in response to the second event of the ordered set of events, transmitting, by the administrative node computer, to the second node computer, an instruction to generate a second data package for the second interaction of the ordered set of interactions, wherein the smart contract indicates that the second interaction will take place in response to the second event;
receiving, by the administrative node computer, from the second node computer, the second data package for the second interaction; and generating, by the administrative node computer, a second block for the blockchain, the second block including the second data package for the second interaction.

2. The method of claim 1, wherein the first notification that the first event has taken place is received from a third node computer, wherein the first interaction is between the second node computer and the third node computer, wherein the second notification that the second event has taken place is received from a fourth node computer, and wherein the second interaction is between the second node computer and the fourth node computer.

3. The method of claim 2, wherein the first event comprises a first task completed by a third user associated with the third node computer, and wherein the second event comprises a second task completed by a fourth user associated with the fourth node computer.

4. The method of claim 1, wherein the first notification that the first event has taken place is received from a third node computer, wherein the second notification that the second event has taken place is received from a fourth node computer, and further comprising:
receiving, by the administrative node computer, a first digital signature for the first notification that the first event has taken place from the third node computer;
verifying, by the administrative node computer, the first digital signature using a first public key associated with the third node computer, wherein the instruction to generate the first data package is transmitted in response to verifying the first digital signature;
receiving, by the administrative node computer, a second digital signature for the second notification that the second event has taken place from the fourth node computer; and
verifying, by the administrative node computer, the second digital signature using a second public key associated with the fourth node computer, wherein the instruction to generate the second data package is transmitted in response to verifying the second digital signature.

5. The method of claim 1, wherein the second node computer generates a first digital signature for the first data package, and a second digital signature for the second data package, and further comprising:
receiving, by the administrative node computer, from the second node computer, the first digital signature for the first data package, wherein the first block includes the first digital signature; and
receiving, by the administrative node computer, from the second node computer, the second digital signature for the second data package, wherein the second block includes the second digital signature.

6. The method of claim 1, wherein the second node computer generates a first digital signature for the smart contract, a second digital signature for the first data package, and a third digital signature for the second data package, and further comprising:
receiving, by the administrative node computer, from the second node computer, the first digital signature for the smart contract;
receiving, by the administrative node computer, from the second node computer, the second digital signature for the first data package, wherein the first block includes the second digital signature; and
receiving, by the administrative node computer, from the second node computer, the third digital signature for the second data package, wherein the second block includes the third digital signature.

7. The method of claim 6, wherein the second node computer uses a first private key to generate the first digital signature for the smart contract, the second digital signature for the first data package, and the third digital signature for the second data package, and further comprising:
receiving, by the administrative node computer, from a first node computer, an additional digital signature for the smart contract, wherein the first node computer generated the additional digital signature using an additional private key.

8. The method of claim 1, further comprising:
in response to receiving the first notification that the first event has taken place, marking, by the administrative node computer, the first event as complete; and
before transmitting the instruction to generate the second data package for the second interaction, verifying, by the administrative node computer, that the first event is marked as complete.

9. The method of claim 1, wherein the first interaction is a first transaction, and the second interaction is a second transaction.

10. The method of claim 9, wherein the first event is a first service, and the second event is a second service.

11. An administrative node computer, comprising:
a processor; and
a computer readable medium, the computer readable medium comprising code, executable by the processor, for implementing a method comprising:
receiving a smart contract indicating that an ordered set of interactions will take place in response to an ordered set of events, wherein the smart contract indicates that each interaction in the ordered set of interactions corresponds to an event in the ordered set of events, and wherein the smart contract indicates that each interaction in the ordered set of interactions will take place in response to a corresponding event only if the corresponding event occurs within a specific event order;
receiving a first notification that a first event of the ordered set of events has taken place;
verifying, based on the smart contract, that the first event is supposed to occur first within the ordered set of events;
determining, based on the smart contract, that a first interaction of the ordered set of interactions is to take place in response to the first event;
in response to the first event of the ordered set of events, transmitting, to a second node computer, an instruction to generate a first data package for the first interaction of the ordered set of interactions, wherein the smart contract indicates that the first interaction will take place in response to the first event;
receiving, from the second node computer, the first data package for the first interaction;
generating a first block for a blockchain, the first block including the first data package for the first interaction;
receiving a second notification that a second event of the ordered set of events has taken place;
verifying, based on the smart contract, that the second event is supposed to occur second within the ordered set of events; and
determining, based on the smart contract, that a second interaction of the ordered set of interactions is to take place in response to the second event;
in response to the second event of the ordered set of events, transmitting, to the second node computer, an instruction to generate a second data package for the second interaction of the ordered set of interactions, wherein the smart contract indicates that the second interaction will take place in response to the second event;

receiving, from the second node computer, the second data package for the second interaction; and generating a second block for the blockchain, the second block including the second data package for the second interaction.

12. The administrative node computer of claim 11, wherein the first notification that the first event has taken place is received from a third node computer, wherein the first interaction is between the second node computer and the third node computer, wherein the second notification that the second event has taken place is received from a fourth node computer, and wherein the second interaction is between the second node computer and the fourth node computer.

13. The administrative node computer of claim 12, wherein the first event comprises a first task completed by a third user associated with the third node computer, and wherein the second event comprises a second task completed by a fourth user associated with the fourth node computer.

14. The administrative node computer of claim 11, wherein the first notification that the first event has taken place is received from a third node computer, wherein the second notification that the second event has taken place is received from a fourth node computer, and the method further comprising:

receiving a first digital signature for the first notification that the first event has taken place from the third node computer;

verifying the first digital signature using a first public key associated with the third node computer, wherein the instruction to generate the first data package is transmitted in response to verifying the first digital signature;

receiving a second digital signature for the second notification that the second event has taken place from the fourth node computer; and verifying the second digital signature using a second public key associated with the fourth node computer, wherein the instruction to generate the second data package is transmitted in response to verifying the second digital signature.

15. The administrative node computer of claim 11, wherein the second node computer generates a first digital signature for the first data package, and a second digital signature for the second data package, and the method further comprising:

receiving, from the second node computer, the first digital signature for the first data package, wherein the first block includes the first digital signature; and receiving, from the second node computer, the second digital signature for the second data package, wherein the second block includes the second digital signature.

16. The administrative node computer of claim 11, wherein the second node computer generates a first digital signature for the smart contract, a second digital signature for the first data package, and a third digital signature for the second data package, and the method further comprising:

receiving, from the second node computer, the first digital signature for the smart contract;

receiving, from the second node computer, the second digital signature for the first data package, wherein the first block includes the second digital signature; and receiving, from the second node computer, the third digital signature for the second data package, wherein the second block includes the third digital signature.

17. The administrative node computer of claim 11, further comprising:

in response to receiving the first notification that the first event has taken place, marking the first event as complete; and before transmitting the instruction to generate the second data package for the second interaction, verifying that the first event is marked as complete.

18. The administrative node computer of claim 11, wherein the first interaction is a first transaction, and the second interaction is a second transaction.

19. The administrative node computer of claim 18, wherein the first event is a first service, and the second event is a second service.

20. The administrative node computer of claim 11, the method further comprising:

in response to receiving the smart contract, transmitting messages to each computer associated with the ordered set of interactions indicating that an interaction will take place if a certain event takes place.

* * * * *